(12) United States Patent
Shirota et al.

(10) Patent No.: US 6,181,953 B1
(45) Date of Patent: *Jan. 30, 2001

(54) RADIO ACCESS SYSTEM FOR A TELEMATIQUE SERVICE

(75) Inventors: Masahiko Shirota; Hitoshi Ishikawa; Ryoichi Ishibashi; Maki Watabe, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/810,711

(22) Filed: Mar. 3, 1997

(30) Foreign Application Priority Data

Mar. 12, 1996 (JP) .................................... 8-055104

(51) Int. Cl.[7] ...................................... H04B 1/38
(52) U.S. Cl. .................. 455/557; 455/3.05; 455/560; 375/222; 379/93.05; 379/100.12
(58) Field of Search .................... 455/557, 424, 455/425, 63, 517, 556, 560, 561, 553; 375/222, 219, 351, 328; 379/100.01, 100.12, 100.13, 100.17, 93.05, 93.07

(56) References Cited

U.S. PATENT DOCUMENTS

| | | | |
|---|---|---|---|
| 4,788,692 | 11/1988 | Takebayashi et al. | 375/27 |
| 4,876,696 | 10/1989 | Yoshikawa | 375/5 |
| 5,347,611 | * 9/1994 | Chang | 395/2.15 |
| 5,487,175 | * 1/1996 | Bayley et al. | 455/557 |
| 5,537,458 | * 7/1996 | Suomi et al. | 455/560 |

FOREIGN PATENT DOCUMENTS

| | | |
|---|---|---|
| 57-033860 | * 2/1982 | (JP) . |
| 57-033861 | * 2/1982 | (JP) . |
| 63-141423 | * 6/1988 | (JP) . |
| 64-049470 | * 2/1989 | (JP) . |
| 4-002014 | * 1/1992 | (JP) . |
| 4-111634 | * 4/1992 | (JP) . |

* cited by examiner

Primary Examiner—Lee Nguyen
(74) Attorney, Agent, or Firm—Staas & Halsey LLP

(57) ABSTRACT

A radio access system connects a public switched telephone network and a subscriber unit. The subscriber unit includes a first detection part detecting a telematique signal; and a first control part transmitting a detection signal of the telematique signal on a control channel and transmitting the telematique signal on a traffic channel while bypassing a first speech coding-and-decoding part. The radio access system includes a second control part, provided between a radio base station and the public switched telephone network, transmitting the telematique signal on the traffic channel toward the public switched telephone network while bypassing a second speech coding-and-decoding part when the detection signal of the telematique signal is transmitted on the control channel.

16 Claims, 27 Drawing Sheets

FIG. 7A
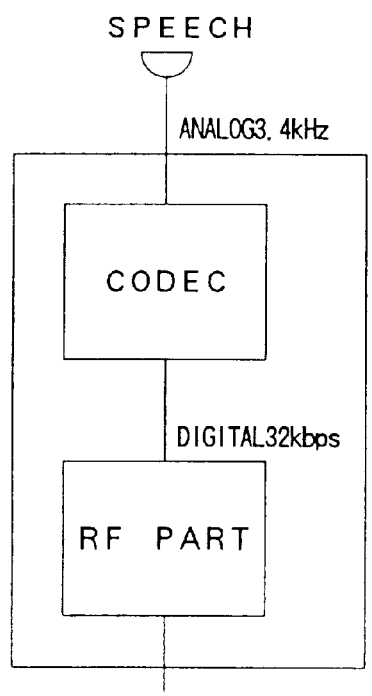
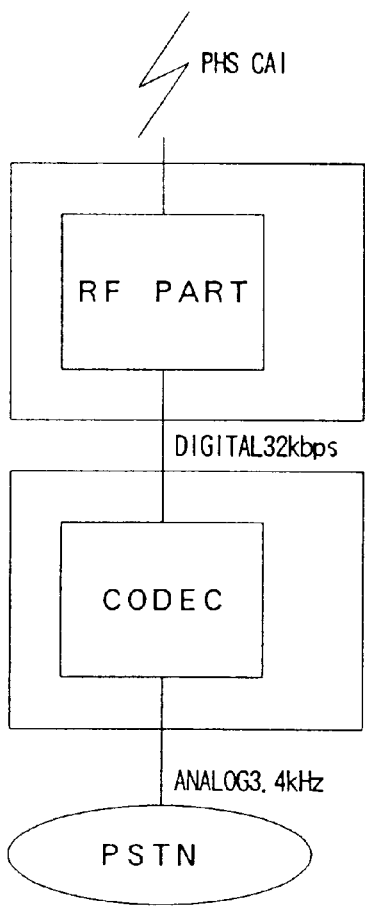
FIG. 7B
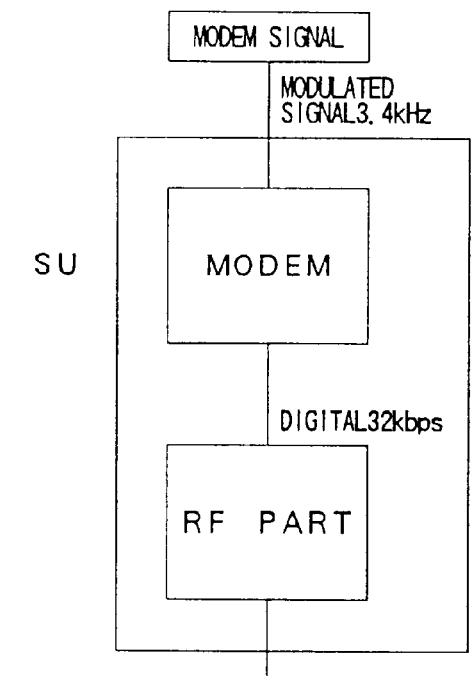
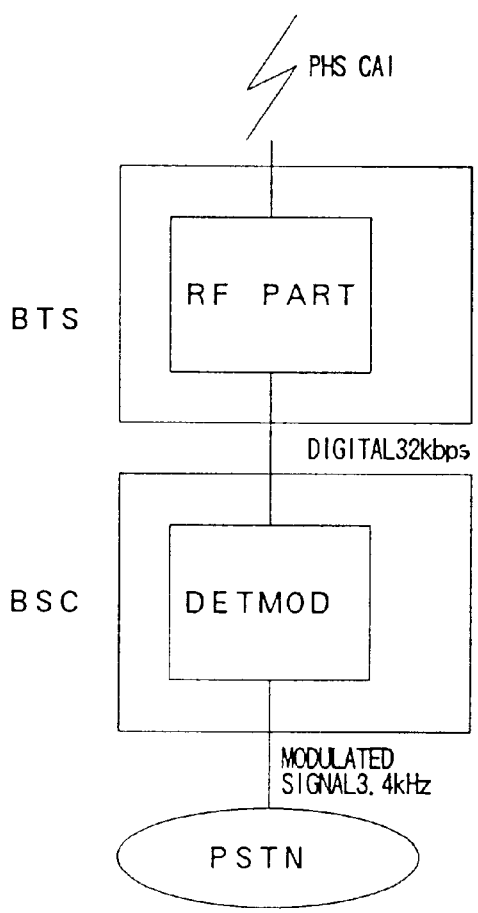

RADIO ACCESS SYSTEM FOR A TELEMATIQUE SERVICE

BACKGROUND OF THE INVENTION

1. Field of the Invention

The present invention generally relates to a radio access system, and more particularly, to a radio access system for a telematique service which is constructed with subscriber lines from an exchanger to subscribers' premises through radio lines.

2. Description of the Related Art

Recently, for constituting the subscriber line from the exchanger to each subscriber's premise, instead of a wire line such as a copper cable or an optical fiber cable, a radio line system is being used. This system is referred to as a wireless local loop (WLL) system. In the WLL system, an air interface used in mobile communication systems (TDMA system which is used in a personal digital cellular system (PDC) and a personal handy phone system (PHS) in Japan, CDMA system, etc.) is used for a radio line part. Further, for a subscriber terminal, a conventional telephone unit is commonly used through a mobile communication subscriber terminal or a dedicated WLL terminal.

The WLL system is provided for replacing the wire-line system as an access system which accommodates subscribers with rapid service at a low cost. Therefore, for services provided in the WLL system, substantially the same convenience as that of the conventional wire telephone is expected. For example, in the WLL system, telecommunication services except a telephone service (which are referred to as "telematique services", such as a facsimile service and a personal-computer communication service, the term "telematique" was made in CCITT) need to be carried out with the same protocol and apparatus as those of the conventional telephone.

The WLL system is constructed based on the mobile communication system. However, the WLL system is not a perfect duplicates of the mobile communication system, but has the following differing features.

As the first feature, though the mobile communication system is constructed in a dedicated mobile communication network which is independent from a public switched telephone network (PSTN), the WLL system is constructed as a part of the PSTN. Therefore, the mobile communication system exclusively uses mobile exchangers in the mobile communication network, but the WLL system is connected to a conventional subscriber exchanger in the PSTN.

As the second feature, the mobile communication system supports only dedicated mobile communication subscriber terminals, but the WLL system supports the conventional wire telephone used in the PSTN as well as the mobile communication subscriber terminal.

These two features may be a large disadvantage when the telematique service dealing with a data signal from such as a facsimile machine or a MODEM is carried out in the WLL system. FIG. 1 shows a basic configuration of the prior-art WLL system.

In FIG. 1, a subscriber terminal SU 10 is provided at the subscriber's premise, and has a modular jack so as to be usable as a conventional telephone. The air interface is provided between the SU 10 and a base terminal station BTS 12. In a speech coding-and-decoding device (CODEC) inside the SU 10, highly efficient coding and decoding of speech are carried out. A telephone TEL 11 is a conventional wire telephone. The BTS 12 accommodates a plurality of SUs 10, and converts the air interface and a base station controller (BSC) interface to each other. The BSC 13 accommodates a plurality of BTSs 12, and has a converting function of a WLL-side interface and a PSTN-side interface. The BSC 13 further has connecting/handing-off/call-processing functions and a monitoring function.

A PSTN 14 is a conventional network, and accommodates the PSTN subscriber telephones TEL 11 and the WLL system through subscriber local exchangers (LEs). The LE 15 is an exchanger for connecting the WLL system to the PSTN, and commonly accommodates the PSTN subscriber telephones.

In the above-discussed configuration of the WLL system, only a speech service is supported. Namely, since the CODEC is provided in the SU 10 and the BSC 13, the telematique service for such as a facsimile machine cannot be provided.

In the following, before considering the telematique service in the WLL system, how the telematique service in the mobile communication system is carried out will be studied.

In the mobile communication system, the dedicated mobile communication network is provided independent from the PSTN, and is connected to the PSTN through a mobile gate switching system.

FIG. 2 shows a illustration for explaining the telematique service in the mobile communication system. In FIG. 2, a portable set PS 20 is connected to a base terminal station BTS 12a through an air interface, and has functions of compressing a subscriber speech and supplying the compressed signal to a traffic channel of the radio lines.

A telematique-service adaptor ADP 21 is connected between the PS 20 and one of a FAX 22 and a MODEM (modulator and demodulator) when the telematique data communication using facsimile transmission and reception or the MODEM is carried out. The ADP 21 carries out a converting operation of the MODEM protocol and a disconnecting control of the CODEC in the PS 20. Therefore, two kinds of ADPs for the facsimile and the MODEM are provided.

The BTS 12a establishes radio links with a plurality of PSs 20, and is connected to a base station controller BSC 23. The BSC 23 accommodates a plurality of BTSs 12a, and has connecting/handing-off/call-processing functions and a monitoring function.

A mobile switching center MSC 24 (which corresponds to the mobile switching system) carries out line connecting and switching operations, and includes an inter-working function IWF 25. The IWF 25 is a FAX/PC adaptor, and controls conversion of the modem protocol and disconnection of the CODEC. The IWF 25 is operable for both protocols of the facsimile machine and the MODEM.

A mobile gate switching system MGS 26 is located between the mobile communication network and one of another mobile communication network and a PSTN 27, and carries out an interactive line switching operation. The PSTN 27 accommodates a PSTN subscriber telephone 29 through an LE 28. Further, the PSTN 27 is connected to the mobile communication network through the MGS 26.

As discussed above, in the mobile communication system, the IWF 25 is additionally provided in the MSC 24, and by the subscriber connecting the FAX 22 to the PS 20 through the ADP 21, a transparent line for the FAX 22 is established between the IWF 25 and the ADP 21. In this way, the facsimile transmitting-and-receiving operation may be carried out.

In the following, a description will be given of how the telematique service in the WLL system is carried out.

FIG. 3 shows an illustration for explaining a prior-art method of carrying out the telematique service in the WLL system. As shown in FIG. 3, in the SU 10, in addition to the modular jack for connecting the conventional telephone, a dedicated connector for connecting a mobile communication adaptor ADP 31 is provided. Namely, in the SU 10, the same function as that of the PS 20 may be provided. Therefore, to the SU 10, both the wire telephone and the ADP 31 may be connected. In this case, for the BSC 13, the same function as that of the IWF 25 is required.

The above-discussed configuration of the WLL system is one method of carrying out the facsimile transmitting-and-receiving operation in the WLL system. However, at present, a telephone combined with a facsimile (referred to as a facsimile-combined telephone) is in wide commercial use. When the conventional telephone TEL 11 is replaced with the facsimile-combined telephone, the facsimile-combined telephone needs to be connected to the SU 10 through the modular jack interface connection. In this case, the ADP 31 becomes unusable. Therefore, there is a problem in that in the above-discussed configuration of the WLL system, a facsimile function of the facsimile-combined telephone may not be used.

In the above-discussed configuration, when the facsimile function is operated in a speech path of the telephone, since the CODEC for coding and decoding the speech is provided in the speech path, the telematique signal such as a facsimile signal and a MODEM signal is distorted due to the CODEC.

In the same way, since a dual-tone-multi frequency (DTMF) signal produced from a push-button phone is also transmitted through the CODEC, the waveform of the DTMF signal may be distorted. Therefore, there is a problem that in the prior-art WLL system, an airline ticket reservation cannot be carried out due to the DTMF signal on an up-link line being distorted, and reproduction of a stored message in an answer phone cannot be carried out due to the DTMF on a down-link line being distorted.

SUMMARY OF THE INVENTION

It is an object of the present invention to provide a radio access system for a telematique service. In the system, a telematique service may be provided in a wireless local loop system, and a facsimile-combined telephone is also usable. Further, transparent transmission of a DTMF signal on both up-link and down-link lines may be positively performed. Therefore, ticket reservation service using the DTMF signal and remote control of the telephone may be positively carried out. This permits the disadvantages described above to be eliminated.

The object described above is achieved by a radio access system connecting a public switched telephone network and a subscriber unit, the subscriber unit comprising: a first detection part detecting a telematique signal; and a first control part transmitting a detection signal of the telematique signal on a control channel and transmitting the telematique signal on a traffic channel while bypassing a first speech coding-and-decoding part; the radio access system comprising a second control part, provided between a radio base station and the public switched telephone network, transmitting the telematique signal on the traffic channel toward the public switched telephone network while bypassing a second speech coding-and-decoding part when the detection signal of the telematique signal is transmitted on the control channel.

According to the above-discussed radio access system, when the telematique signal such as a facsimile signal or a MODEM signal is transmitted from the subscriber unit to the public switched telephone network, the speech coding-and-decoding part is bypassed, and, thus, the telematique signal may be positively transmitted without being distorted.

The object described above is also achieved by a radio access system connecting a public switched telephone network and a subscriber unit, the radio access system comprising: a second detection part detecting a telematique signal; and a third control part transmitting a detection signal of the telematique signal on a control channel, and transmitting the telematique signal on a traffic channel while bypassing a second speech coding-and-decoding part; wherein the second detection part and the third control part are provided between the public switched telephone network and a radio base station; the subscriber unit comprising a fourth control part transmitting the telematique signal on the traffic channel while bypassing a first speech coding-and-decoding part when the detection signal of the telematique signal is transmitted on the control channel.

According to the above-discussed radio access system, when the telematique signal such as a facsimile signal or a MODEM signal is transmitted from the public switched telephone network to the subscriber unit, the speech coding-and-decoding part is bypassed, and, thus, the telematique signal may be positively transmitted without being distorted.

The object described above is also achieved by the radio access system mentioned above, wherein the second detection part comprises a plurality of detection parts, a number thereof being less than a number of lines between the public switched telephone network and the radio base station.

According to the above-discussed radio access system, the number of lines for communicating the telematique signal is less than the total number of lines. Therefore, the number of the detection parts in the second detection part may be reduced, and, thus, a circuit size of the radio base station is prevented from being enlarged.

The object described above is also achieved by the radio access system mentioned above, wherein each of the subscriber unit and the radio base station comprises a protocol conversion part converting between a communication protocol for the telematique signal and a communication protocol for a telephone signal.

According to the above-discussed radio access system, for the telematique signal, a dedicated communication protocol may be used. Therefore, the telematique signal may be positively transmitted without an error due to fading, etc.

The object described above is also achieved by the radio access system mentioned above, wherein the subscriber unit comprises a subscriber termination device.

According to the above-discussed radio access system, for the subscriber termination device, a conventional facsimile-combined telephone may be used to carry out facsimile transmission and reception.

The object described above is also achieved by the radio access system mentioned above, wherein the subscriber unit comprises a mobile communication subscriber unit.

According to the above-discussed radio access system, when a facsimile machine or a facsimile-combined telephone is connected to the mobile communication subscriber unit through an adaptor, facsimile transmission and reception may be carried out.

The object described above is also achieved by a radio access system connecting a public switched telephone network and a subscriber unit, the subscriber unit comprising: a third detection part detecting a dual-tone multi-frequency (DTMF) signal; and a fifth control part controlling transmission of a detection signal of the DTMF signal on a control channel; the radio access system comprising: a first generation part generating the DTMF signal; and a sixth control part controlling the first generation part to generate the DTMF signal and transmitting the DTMF signal toward the public switched telephone network when the detection signal of the DTMF signal is detected on the control channel; wherein the first generation part and the sixth control part are provided between a radio base station and the public switched telephone network.

According to the above-discussed radio access system, the DTMF signal may be positively transmitted from the subscriber unit to the public switched telephone network without being distorted. Therefore, in the radio access system, by calling a ticket center connected to the public switched telephone network, a ticket reservation may be easily carried out.

The object described above is also achieved by a radio access system connecting a public switched telephone network and a subscriber unit, the radio access system comprising: a fourth detection part detecting a dual-tone multi-frequency (DTMF) signal; and a seventh control part controlling transmission of a detection signal of the DTMF signal on a control channel; wherein the fourth detection part and the seventh control part are provided between a radio base station and the public switched telephone network; the subscriber unit comprising an eighth control part carrying out one of an operation of detecting the DTMF signal when the detection signal of the DTMF signal is transmitted on the control channel and an operation of controlling a second generation part to generate a DTMF signal.

According to the above-discussed radio access system, the DTMF signal may be positively transmitted from the public switched telephone network to the subscriber unit without being distorted. Therefore, in the radio access system, from a telephone connected to the public switched telephone network, a user may remotely reproduce a speech signal stored in an answer phone of a subscriber unit used in a wireless local loop system such as a mobile communication system.

The object described above is also achieved by a radio access system connecting a public switched telephone network and a subscriber unit, the subscriber unit comprising: a third detection part detecting a dual-tone multi-frequency (DTMF) signal; and a ninth control part transmitting a detection signal of the DTMF signal on a control channel and transmitting the DTMF signal on a traffic channel while bypassing a first speech coding-and-decoding part; the radio access system comprising a tenth control part, provided between a radio base station and the public switched telephone network, transmitting the DTMF signal on the traffic channel toward the public switched telephone network while bypassing a second speech coding-and-decoding part when the detection signal of the DTMF signal is transmitted on the control channel.

According to the above-discussed radio access system, the DTMF signal may be positively transmitted from the subscriber unit to the public switched telephone network without being distorted. Therefore, the first generation part of the DTMF signal becomes unnecessary.

The object described above is also achieved by a radio access system connecting a public switched telephone network and a subscriber unit, the radio access system comprising: a fourth detection part detecting a dual-tone multi-frequency (DTMF) signal; and an eleventh control part transmitting a detection signal of the DTMF signal on a control channel and transmitting the DTMF signal on a traffic channel while bypassing a second speech coding-and-decoding part; wherein the fourth detection part and the eleventh control part are provided between a radio base station and the public switched telephone network; the subscriber unit comprising a twelfth control part controlling the DTMF signal transmitted on the traffic channel to bypass a first coding-and-decoding part when the detection signal of the DTMF signal is transmitted on the control channel.

According to the above-discussed radio access system, the DTMF signal may be positively transmitted from the public switched telephone network to the subscriber unit without being distorted. Therefore, the second generation part generating the DTMF signal becomes unnecessary.

The object described above is also achieved by the radio access system mentioned above, wherein the fourth detection part comprises a plurality of detection parts, a number thereof being less than a number of lines between the public switched telephone network and the radio base station.

According to the above-discussed radio access system, the number of lines for communicating the DTMF signal is less than the total number of lines. Therefore, the number of the detection parts in the fourth detection part may be reduced, and, thus, a circuit size of the radio base station is prevented from being enlarged.

The object described above is also achieved by the radio access system mentioned above, wherein the subscriber unit comprises a subscriber termination device.

According to the above-discussed radio access system, by a telephone connected to the subscriber termination device, the DTMF signal may be transmitted without being distorted.

The object described above is also achieved by the radio access system mentioned above, wherein the subscriber unit comprises a mobile communication subscriber unit.

According to the above-discussed radio access system, by the mobile communication subscriber unit, the DTMF signal may be transmitted without being distorted.

Other objects and further features of the present invention will be apparent from the following detailed description when read in conjunction with the accompanying drawings.

BRIEF DESCRIPTION OF THE DRAWINGS

FIG. 7A and FIG. 7B show illustrations for explaining signal transmission for speech data and MODEM signal data (for example, facsimile data) between the subscriber and a PSTN;

DETAILED DESCRIPTION OF THE PREFERRED EMBODIMENTS

Figure 1:
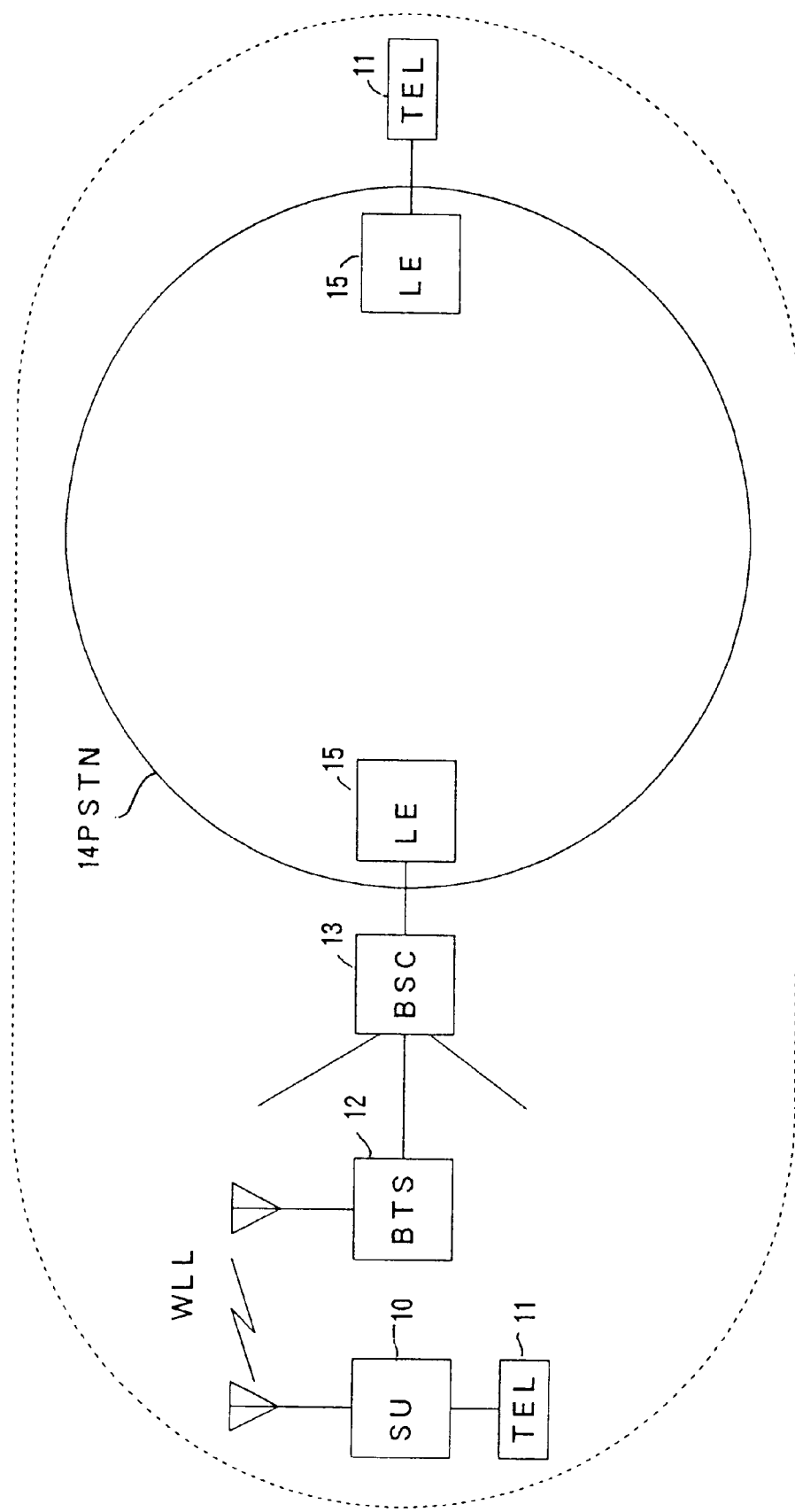
FIG. 1 shows a basic configuration of a prior-art wireless local loop (WLL) system.
Figure 2:
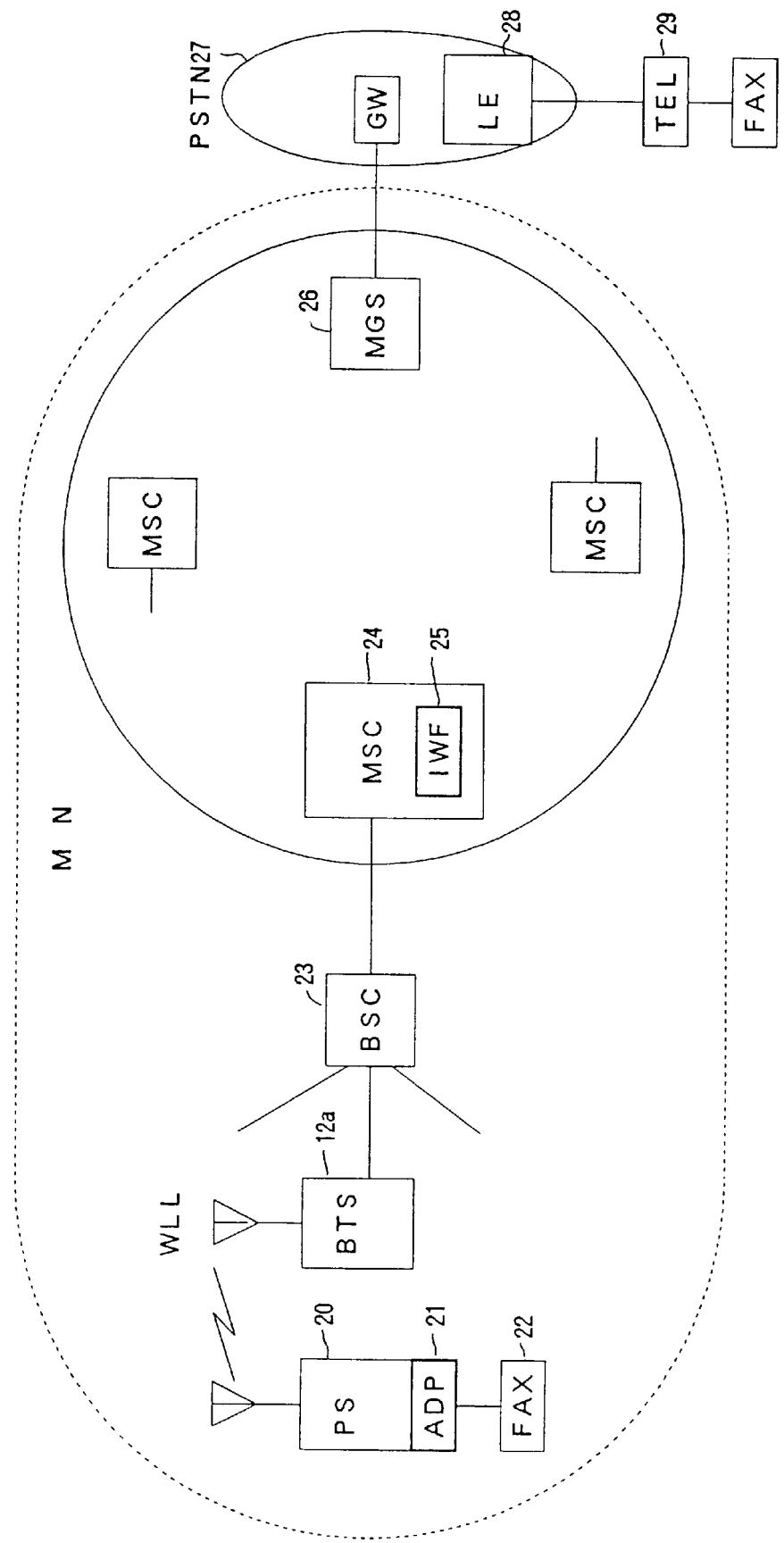
FIG. 2 shows a illustration for explaining a telematique service in a mobile communication system.
Figure 3:
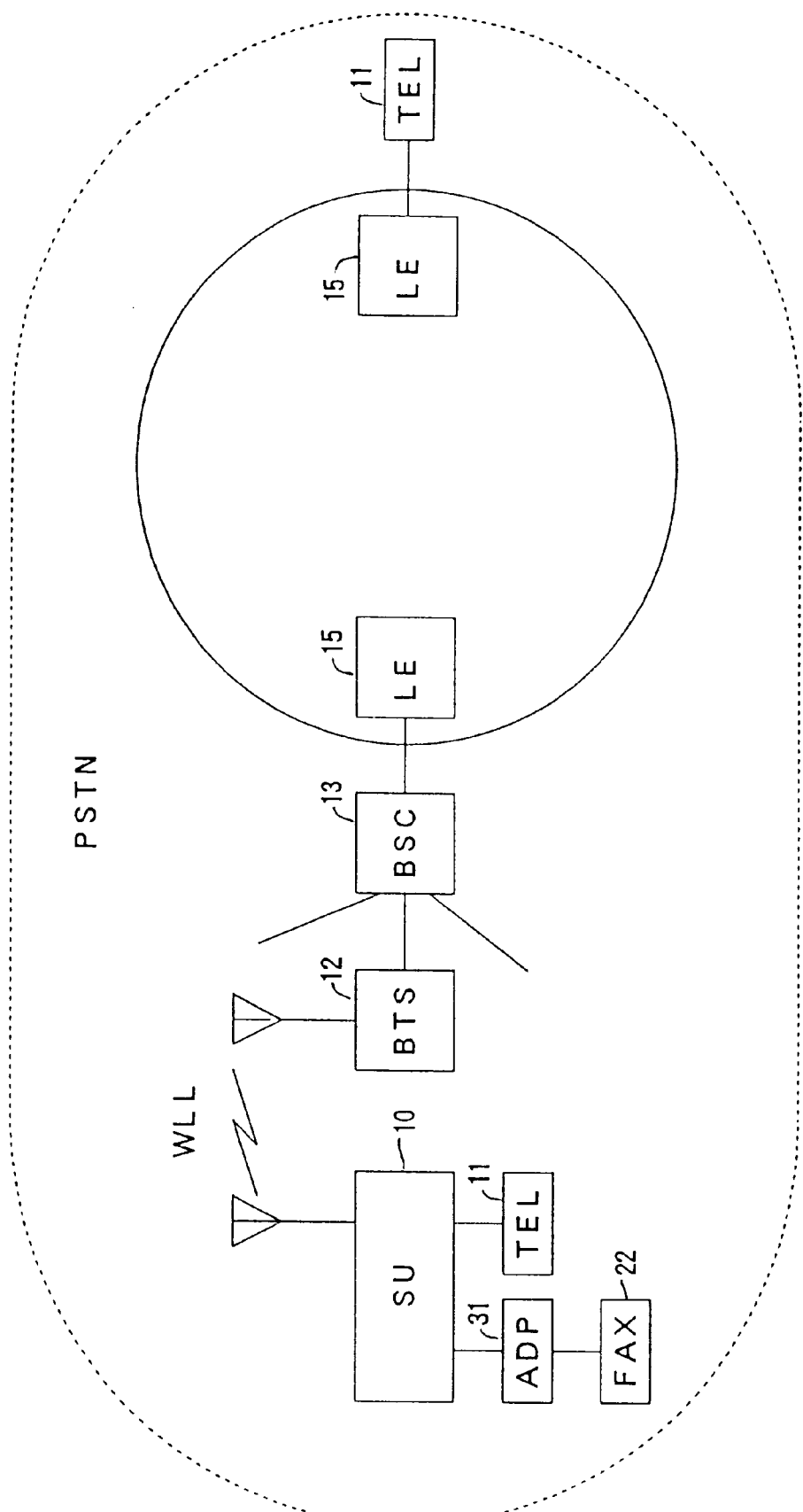
FIG. 3 shows an illustration for explaining a prior-art method of carrying out a telematique service in the WLL system.
Figure 4:
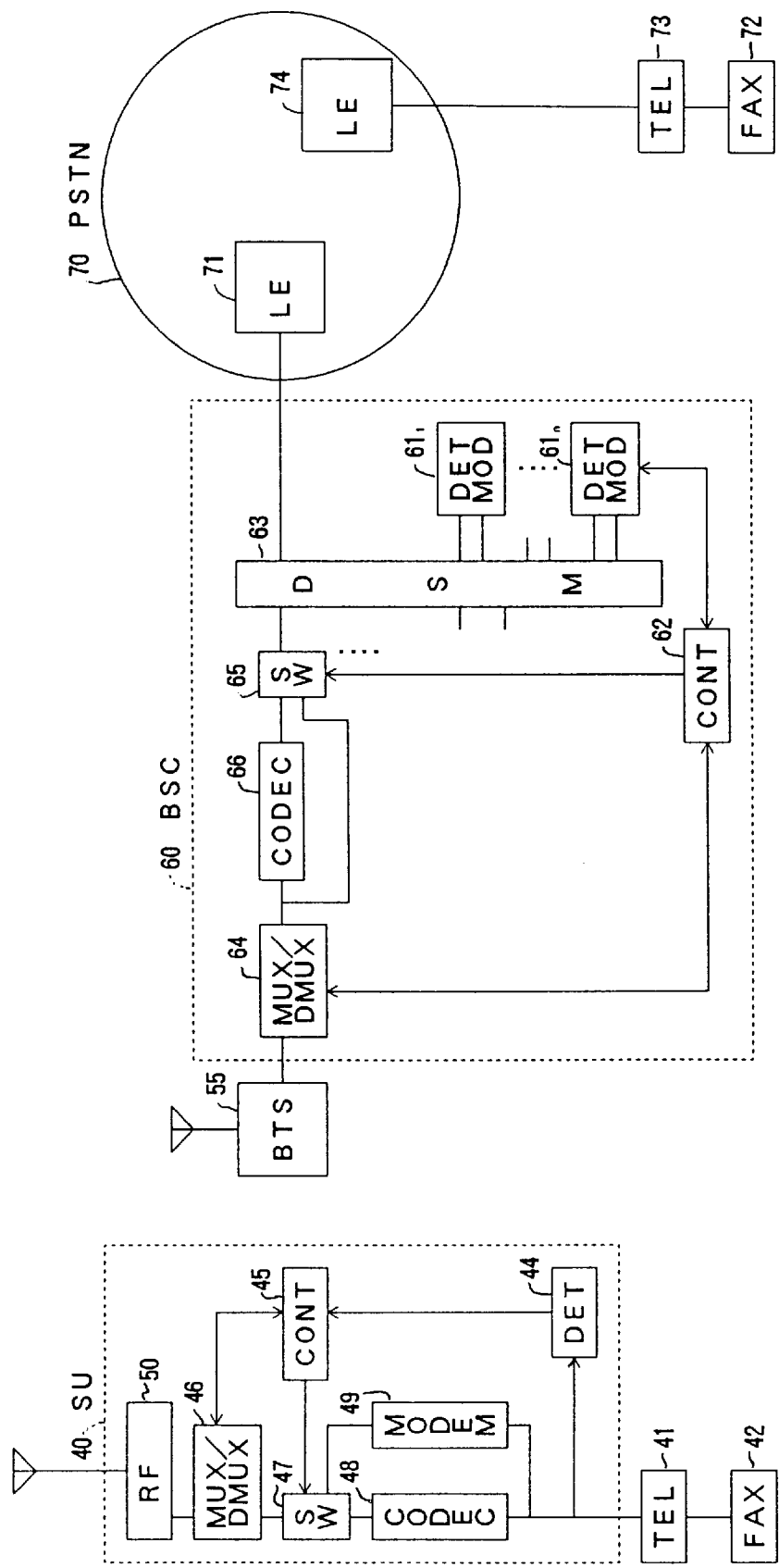
FIG. 4 shows a block diagram of a first embodiment of a radio access system for a telematique service according to the present invention.

First, a description will be given of a first embodiment of a radio access system for a telematique service according to the present invention, by referring to FIG. 4. FIG. 4 shows a block diagram of the first embodiment of the radio access system for the telematique service according to the present invention. In the radio access system shown in FIG. 4, a subscriber unit (SU) 40 has functions of connecting subscriber termination devices such as a conventional telephone (TEL) 41, a facsimile machine (FAX) 42, and a modulator-and-demodulator (MODEM) 49.

In the SU 40 shown in FIG. 4, a telematique detection part (DET) 44 (constituting a first detection part) detects an answer tone of a facsimile machine or a MODEM, and determines a kind of the transmitted signal in order to produce a telematique detection signal such as a facsimile mode signal or a MODEM mode signal.

A telematique control part (CONT) 45 (constituting first and fourth control parts) receives the telematique detection signal produced from the DET 44, or receives switching information of a control channel produced from a multiplexing-and-demultiplexing part (MUX/DMUX) 46, and controls a switching operation of a switching part (SW) 47.

The MUX/DMUX 46 separates the control channel from a data sequence transmitted from a base station controller (BSC) 60, and transmits the separated control channel to the CONT 45. The SW 47 switches between a speech coding-and-decoding part (CODEC) 48 and the MODEM 49.

The CODEC 48 (constituting a first speech coding-and-decoding part) carries out a highly efficient conversion between speech data and speech codes, and also has functions of converting the speech data into an analog speech signal and converting the analog speech signal into the digital speech data. The MODEM 49 carries out a modulating and demodulating operation during a data communication. A radio frequency part (RF) 50 establishes a link of a radio line with a base terminal station (BTS) 55.

The BTS 55 establishes radio-line links with a plurality of SUs 40, and is connected to the BSC 60. The BSC 60 accommodates a plurality of BTSs, and converts signals between the WLL-side interface and the PSTN-side interface. The BSC 60 is connected to a local subscriber exchanger (LE) 71.

In the BSC 60, telematique detection and modulation-demodulation parts (DETMODs) $61_1$ to $61_n$ (constituting a second detection part) detect an answer tone from the facsimile machine, the MODEM, etc., and discriminate the signal mode to transmit a telematique detection signal such as a FAX mode signal or a MODEM mode signal. Further, the DETMODs $61_1$ to $61_n$ are connected to a line switching part (DSM) 63 to modulate and demodulate data signals in a data communication.

A telematique control part (CONT) 62 (constituting second and third control parts) receives the telematique detection signal and controls a switch part (SW) 65. Further, the CONT 62 transmits the telematique detection signal to a multiplexer/demultiplexer (MUX/DEMUX) 64. The MUX/DEMUX 64 multiplexes the telematique detection signal on a control channel to transmit to the SU 40.

The SW 65 connects or disconnects a speech coder-and-decoder (CODEC) 66 on a path between the DSM 63 and the MUX/DEMUX 64. The CODEC 66 (constituting a second speech coding-and-decoding part) converts between the speech data and a highly efficient speech code. The DSM 63 allocates a line to the WLL system and transits the timeslots, and further connects or disconnects the DETMODs $61_1$ to $61_n$.

The PSTN 70 is a conventional network, and accommodates a PSTN telephone (TEL) 73 and the WLL system through the LE 74. In the WLL system constructed with the above-discussed devices, the subscriber connects the FAX 42 and the MODEM 49 to the SU 40, and carries out transmitting-and-receiving operations and a personal computer communication with another subscriber in the PSTN 70.

In the following, a description will be given of an operation of the MODEM 49 in the SU 40.

Figure 5:
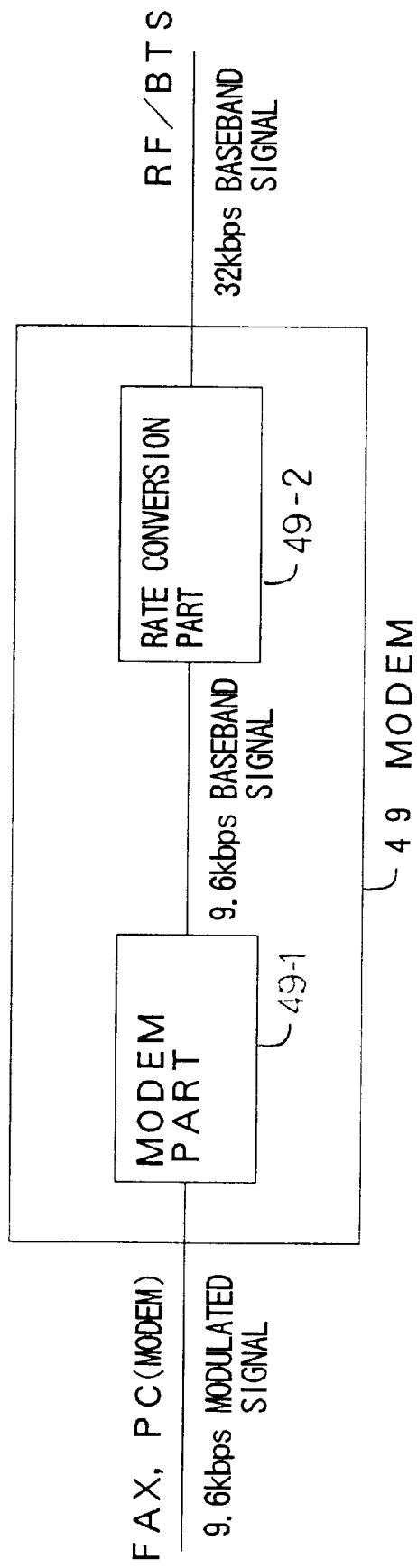
FIG. 5 shows a configuration example of a MODEM in a subscriber unit (SU) shown in FIG. 4.

FIG. 5 shows a configuration example of the MODEM 49 in the SU 40 shown in FIG. 4. In the following WLL system configuration, for example, the 3.4-kHz-bandwidth speech produced from the TEL 41 is converted to 32-kbps data in the CODEC 48, and the FAX 42 produces a 9.6-kbps modulated signal which also has a 3.4-kHz bandwidth. Further, when a radio frequency signal is transmitted from the SU 40 to the BTS 55, the 32-kbps data is multiplexed on the radio frequency. Therefore, when the FAX 42 is used, the 9.6-kbps modulated signal has to be converted to the 32-kbps data in order to be multiplexed on the radio frequency. The above-discussed operation is shown in FIG. 5.

In FIG. 5, the MODEM 49 is constructed with a MODEM part 49-1 and a rate conversion part 49-2. When the FAX 42 is used, the 9.6-kbps modulated signal which has the 3.4-kHz bandwidth is demodulated to produce a 9.6-kbps baseband signal by the MODEM part 49-1. The 9.6-kbps baseband signal is converted to the 32-kbps data to be multiplexed on the radio frequency in the rate conversion part 49-2.

In the above description, the FAX 42 is used. In general, the facsimile machine includes a modem converting facsimile data into a 3.4-kHz bandwidth telephone line signal. Therefore, instead of the FAX 42, a device including the modem such as a personal computer may be also used. The modem included in the facsimile machine and the personal computer is internationally standardized, as, for example, V22, V22bis, V32, etc. For also the MODEM part 49-1 in the MODEM 49, such a modem may be used.

Figure 6:
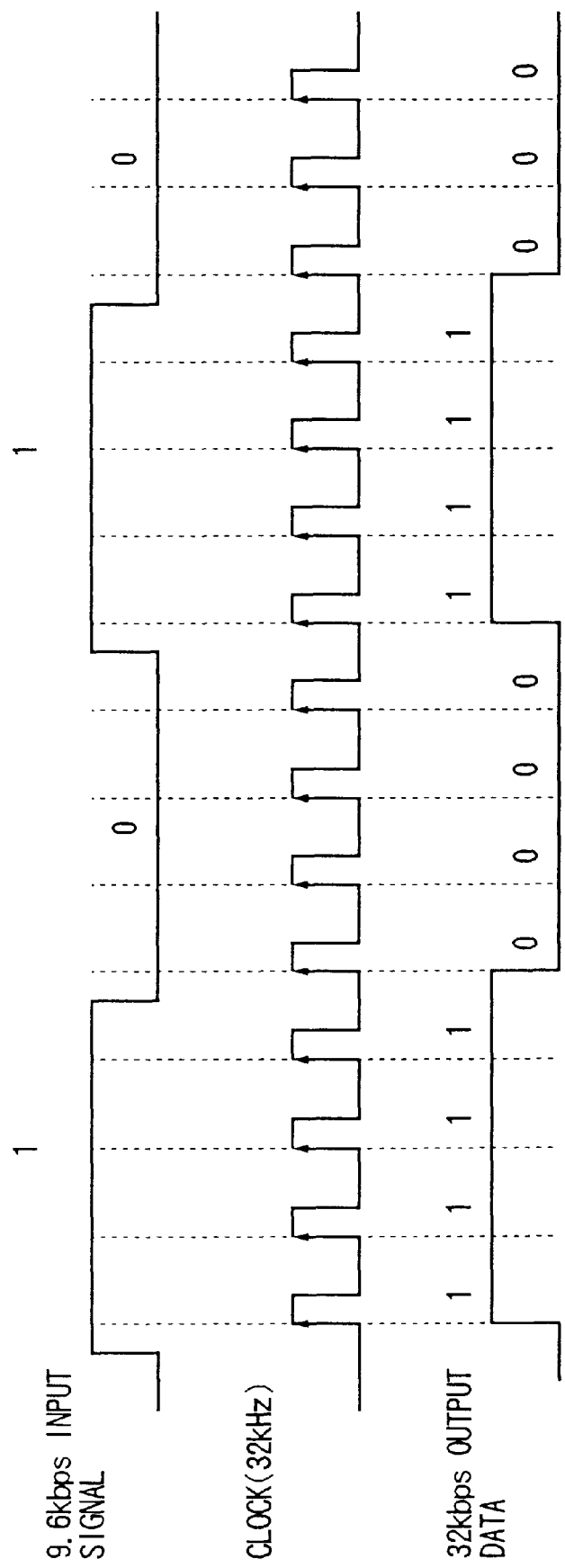
FIG. 6 shows an illustration for explaining an operation of a rate conversion part shown in FIG. 5.

FIG. 6 shows an illustration for explaining an operation of the rate conversion part 49-2 shown in FIG. 5. For a converting operation, for example, as shown in FIG. 6, the 9.6-kbps signal from the MODEM part 49-1 is clocked by a 32-kHz clock to produce the 32-kbps data.

In the above-discussed operation of the MODEM 49, for an operation from the BTS to the subscriber, the reverse operation may be carried out. Further, each of the DETMODs 61₁ to 61ₙ in the BSC 60 may include a MODEM having the same configuration as that of the MODEM 49.

FIG. 7A and FIG. 7B show illustrations for explaining signal transmission for the speech data and the MODEM signal data (facsimile data) between the subscriber and the PSTN. In FIG. 7A, the 3.4-kHz-bandwidth analog speech signal produced from the telephone is converted to the digital 32-kbps speech data in the CODEC, and is multiplexed on the radio frequency to be transmitted to the base terminal station (BTS). In the base station controller (BSC), the digital 32-kbps speech data demultiplexed from the radio frequency is converted to the 3.4-kHz-bandwidth analog speech signal, and is transmitted to the PSTN. In this case, in the same way, the analog speech signal transmitted from the PSTN is also converted and transmitted to the subscriber.

In FIG. 7B, the 9.6-kbps MODEM signal having the 3.4-kHz bandwidth produced from, for example, the facsimile machine, is converted to the digital 32-kbps data in the MODEM, and is multiplexed on the radio frequency to be transmitted to the BTS. In the DETMODs of the BSC, the digital 32-kbps speech data demultiplexed from the radio frequency is converted to the 9.6-kbps MODEM signal having the 3.4-kHz bandwidth, and is transmitted to the PSTN. In this case, in the same way, the 9.6-kbps MODEM signal transmitted from the PSTN is also converted and transmitted to the subscriber.

In the following, a detailed sequence of transmitting the facsimile data from the FAX 42 in the SU 40 to a FAX 72 in the PSTN 70 will be given.

(1) A user of the FAX 42 in the SU 40 calls from the FAX 42 or the TEL 41;
(2) The FAX 72 in the PSTN 70 automatically respond;
(3) A conventional speech call line is established between the FAX 42 and the FAX 72;
(4) A receive-side facsimile machine, namely the FAX 72 in the PSTN 70 transmits a FAX acknowledge signal;
(5) The DETMOD (for example, 61₁) for the connection line in the BSC 60 detects the FAX acknowledge signal, and transmits a FAX mode signal to the CONT 62 in the BSC 60;
(6) Further, the DETMOD (for example, 61₁) for the connection line in the BSC 60 starts up a MODEM function, and prepares to modulate and demodulate the data signal in the line;
(7) In response to the FAX mode signal, the CONT 62 controls the SW 65 so as to bypass the CODEC 66, and multiplexes the FAX mode signal on the control channel in the MUX/DEMUX 64 to transmit to the SU 40;
(8) The SU 40 demultiplexes the FAX mode signal from the control channel in the MUX/DMUX 46, and transmits the signal to the CONT 45; and
(9) The CONT 45 controls the SW 47 to switch from the CODEC 48 to the MODEM 49.

In the case where the facsimile data is transmitted from the FAX 72 in the PSTN 70 to the FAX 42 in the SU 40, the detailed sequence will be given as follows:

(1) A user of the FAX 72 in the PSTN 70 calls from the FAX 72 or the TEL 73;
(2) The FAX 42 in the SU 40 automatically respond;
(3) A conventional speech call line is established between the FAX 72 and the FAX 42;
(4) A receive-side facsimile machine, namely the FAX 42 in the SU 40 transmits a FAX acknowledge signal;
(5) The DET 44 in the SU 40 detects the FAX acknowledge signal, and transmits a FAX mode signal to the CONT 45 in the SU 40;
(6) In response to the FAX mode signal, the CONT 45 controls the SW 47 so as to switch from the CODEC 48 to the MODEM 49, and multiplexes the FAX mode signal on the control channel in the MUX/DEMUX 46 to transmit to the BSC 60;
(7) The BSC 60 demultiplexes the FAX mode signal from the control channel in the MUX/DMUX 64, and transmits the signal to the CONT 62; and
(8) The CONT 62 controls the SW 65 so as to bypass the CODEC 66, and starts up and connects the DETMOD (for example, 61₁) for the connection line.

In the above-discussed sequences, by bypassing the CODECs 48, 66 provided in the SU 40 and the BSC 60, a clear line, through which the FAX signal may be transmitted without being distorted, is established between the FAX 42 in the SU 40 and the FAX 72 in the PSTN 70. As a result, when FAX transmission is carried out from either the SU 40 or the PSTN 70, the FAX transmission and reception may be easily carried out by the conventional sequence used in the facsimile communication. Namely, also in the WLL system, when using the facsimile-combined telephone, the facsimile transmission and reception may be easily carried out.

In the WLL system, when the system is constructed, radio path design is carried out so as to minimize influences such as fading and shadowing. In this system, since a location of the SU 40 is fixed, there is no influence of Rayleigh fading. Therefore, there is substantially no need for changing a protocol in the radio path, but it is possible to prepare a function of the changing protocol.

Figure 8:
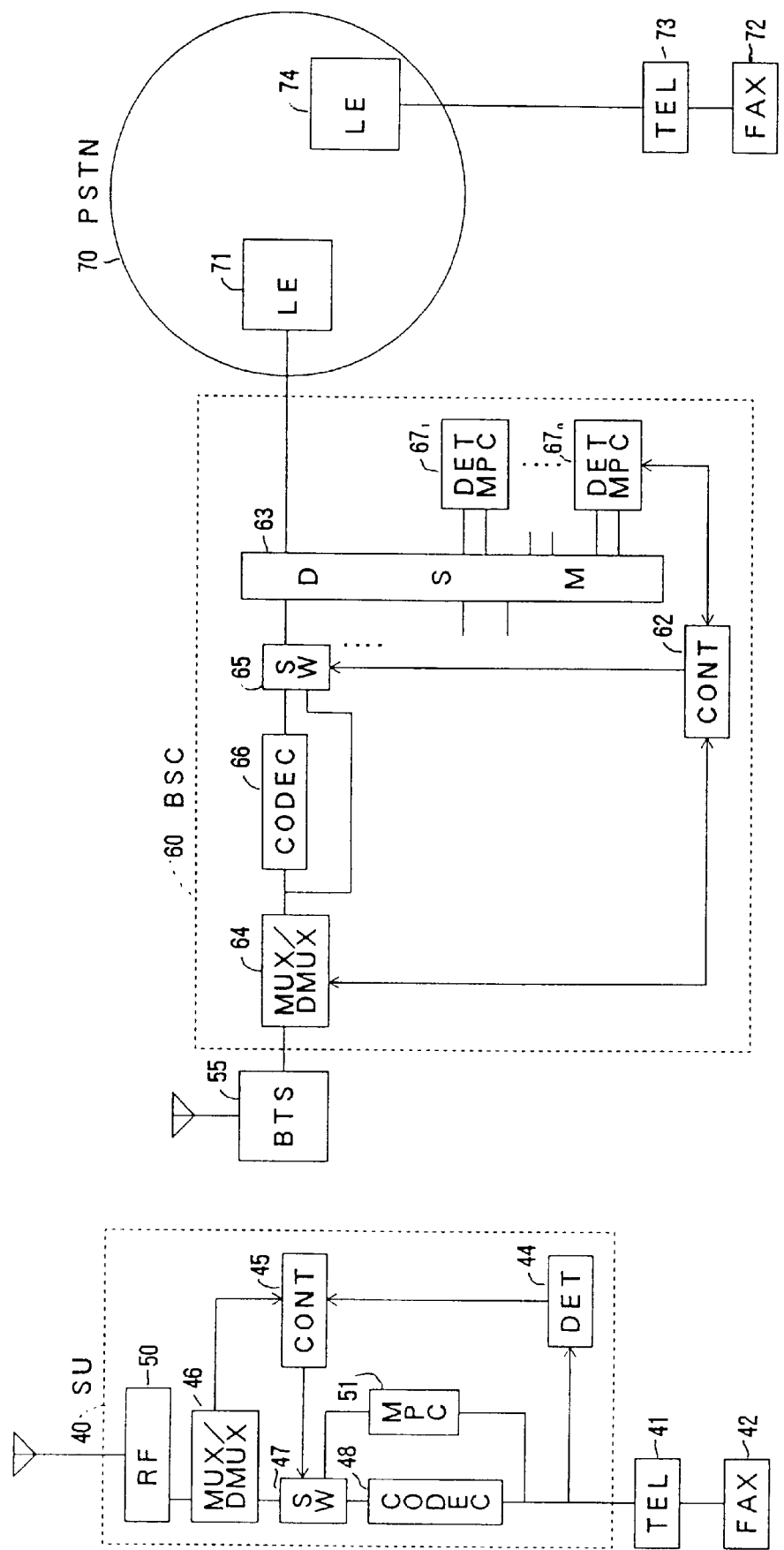
FIG. 8 shows a block diagram of a second embodiment of the radio access system for the telematique service according to the present invention.

Next, a description will be given of a second embodiment of the radio access system for the telematique service according to the present invention, by referring to FIG. 8. FIG. 8 shows a block diagram of the second embodiment of the radio access system for the telematique service according to the present invention. The second embodiment of the radio access system has a function of changing protocol in the radio path.

Different from the first embodiment shown in FIG. 4, in the SU 40, instead of the MODEM 49, a modem protocol conversion part having a MODEM function (MPC) 51 is provided for converting between the protocol for the FAX and the MODEM and the protocol for the radio path. In the BSC 60, instead of the DETMODs $61_1$ to $61_n$, DETMPCs $67_1$ to $67_n$ having the MODEM function and the MPC function are provided for converting between the protocol for the FAX and the MODEM and the protocol for the radio path. For the protocol for the radio path, for example, WORM-ARQ is used. In the WORM-ARQ, a selective repeat method (SR) and a go-back-N method (GBN) are switched with each other according to transmission quality in the radio path.

In a case where the facsimile data is transmitted from the FAX 42 in the SU 40 to the FAX 72 in the PSTN 70, the transmission sequence will given as follows:

(1) A user of the FAX 42 in the SU 40 calls from the FAX 42 or the TEL 41;

(2) The FAX 72 in the PSTN 70 automatically responses;

(3) A conventional speech call line is established between the FAX 42 and the FAX 72;

(4) A receive-side facsimile machine, namely the FAX 72 in the PSTN 70 transmits a FAX acknowledge signal;

(5) The DETMPC (for example, $67_1$) for the connection line in the BSC 60 detects the FAX acknowledge signal, and transmits a FAX mode signal to the CONT 62 in the BSC 60;

(6) Further, the DETMPC (for example, $67_1$) for the connection line in the BSC 60 starts up a MPC function, and prepares to terminate the radio FAX interface in the line;

(7) In response to the FAX mode signal, the CONT 62 controls the SW 65 so as to bypass the CODEC 66, and multiplexes the FAX mode signal on the control channel in the MUX/DEMUX 64 to transmit to the SU 40;

(8) The MUX/DMUX 46 in the SU 40 demultiplexes the FAX mode signal from the control channel, and transmits the signal to the CONT 45; and (9) The CONT 45 controls the SW 47 to bypass the CODEC 48.

In the case where the facsimile data is transmitted from the FAX 72 in the PSTN 70 to the FAX 42 in the SU 40, the detailed sequence will be given as follows:

(1) A user of the FAX 72 in the PSTN 70 calls from the FAX 72 or the TEL 73;

(2) The FAX 42 in the SU 40 automatically responses;

(3) A conventional speech call line is established between the FAX 72 and the FAX 42;

(4) A receive-side facsimile machine, namely the FAX 42 in the SU 40 transmits a FAX acknowledge signal;

(5) The DET 44 in the SU 40 detects the FAX acknowledge signal, and transmits a FAX mode signal to the CONT 45 in the SU 40;

(6) In response to the FAX mode signal, the CONT 45 controls the SW 47 so as to bypass the CODEC 48 and to pass through the MPC 51, and multiplexes the FAX mode signal on the control channel in the MUX/DEMUX 46 to transmit to the BSC 60;

(7) The MUX/DEMUX 64 in the BSC 60 demultiplexes the FAX mode signal from the control channel, and transmits the signal to the CONT 62; and (8) The CONT 62 controls the SW 65 so as to bypass the CODEC 66.

In the above-discussed sequences, by bypassing the CODECs 48, 66 provided in the SU 40 and the BSC 60, the modem protocol is converted in the radio path, and, thus, an errorless line, through which the FAX signal may be transmitted without being distorted, is established between the FAX 42 in the SU 40 and the FAX 72 in the PSTN 70. As a result, when FAX transmission is carried out from either the SU 40 or the PSTN 70, the FAX transmission and reception may be easily carried out by the conventional sequence used in the facsimile communication. Namely, also in the WLL system, when using the facsimile-combined telephone, the facsimile transmission and reception may be easily carried out.

Further, in the WLL system, for the subscriber's terminal device, a terminal device (for example, a portable telephone set) for the mobile communication is also usable.

Figure 9:
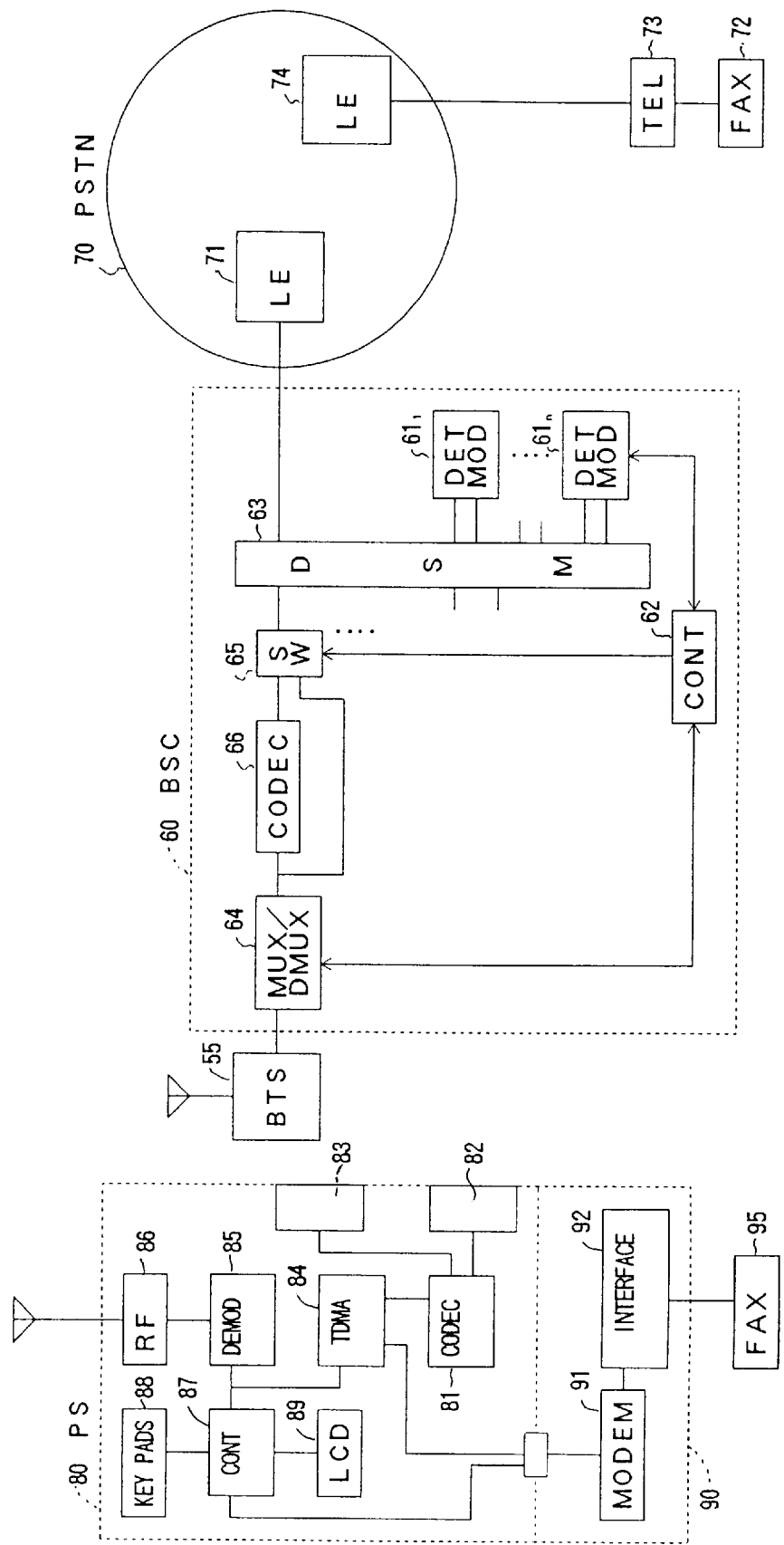
FIG. 9 shows a block diagram of a third embodiment of the radio access system for the telematique service according to the present invention.

Next, a description will be given of a third embodiment of the radio access system for the telematique service according to the present invention, by referring to FIG. 9. FIG. 9 shows a block diagram of the third embodiment of the radio access system for the telematique service according to the present invention. In the third embodiment of the radio access system, a subscriber's terminal (portable set: PS) 80 for the mobile communication is used instead of the SU 40 in the WLL system.

In the PS 80 shown in FIG. 9, a speech coding-and-decoding part (CODEC) 81 converts between the speech data and the highly efficient speech codes, and has both functions of converting the speech data to the analog speech signal and converting the analog speech signal to the digital speech data. To the CODEC 81, a microphone 82 and a speaker 83 are connected.

A time division multiple access (TDMA) processing part 84 multiplexes-and-demultiplexes the speech data on-and-from time slots of the TDMA system. A modulation-and-demodulation part 85 carries out a modulation-and-demodulation operation on an air interface. A radio frequency (RF) part 86 establishes a radio path link with the BTS 55. A control part (CONT) 87 is connected to the TDMA processing part 84, and controls the whole operation of the PS 80. To the CONT 87, key pads 88 for an input operation and a liquid crystal display (LCD) 89 for an output display are connected.

Further, a FAX adaptor (ADP) 90 is connected between the PS 80 and a FAX 95, when the facsimile transmission and reception is carried out. A MODEM 91 provided inside of the ADP 90 is connected to the TDMA processing part 84 inside of the PS 80, and has modulating and demodulating functions when the data communication is held. The CONT 87, when the ADP 90 is connected to the PS 80, disconnects the CODEC 81 from the TDMA processing part 84. An interface part 92 is connected to the FAX 95, and interfaces between the MODEM 91 and the FAX 95.

The BTS 55 establishes radio-line links with a plurality of subscribers, and is connected to the BSC 60. The BSC 60 accommodates a plurality of BTSs 55, and converts between the WLL-side interface and the PSTN-side interface. The BSC 60 is connected to the local subscriber exchanger (LE) 71.

In the BSC 60, the telematique detection and modulation-demodulation parts (DETMODs) 61₁ to 61ₙ detect an answer tone from the facsimile, the MODEM, etc., and discriminate the signal mode to transmit a telematique detection signal such as a FAX mode signal and a MODEM mode signal. Further, the DETMODs 61₁ to 61ₙ are connected to the line switching part (DSM) 63 to modulate and demodulate the data signal in the data communication.

The telematique control part (CONT) 62 receives the telematique detection signal and controls the switch part (SW) 65. Further, the CONT 62 transmits the telematique detection signal to the multiplexer/demultiplexer (MUX/DEMUX) 64. The MUX/DEMUX 64 multiplexes the telematique detection signal on the control channel to transmit to the subscriber.

The SW 65 connects or disconnects the speech coder-and-decoder (CODEC) 66 on the path between the DSM 63 and the MUX/DEMUX 64. The CODEC 66 converts between the speech data and the highly efficient speech codes. The DSM 63 allocates the line to the WLL system and transits the timeslots, and further connects or disconnects the DETMODs 61₁ to 61ₙ.

The PSTN 70 is the conventional network, and accommodates the PSTN telephone (TEL) 73 and the WLL system through the LE 74. In the WLL system constructed with the above-discussed devices, the subscriber connects the FAX 42 and the MODEM to the subscriber, and carries out transmitting-and-receiving operations and the personal computer communication with another subscriber in the PSTN 70.

In the third embodiment, even when the telematique detection signal is produced from either the BSC 60 or the subscriber, the telematique detection signal is transmitted on the control channel. In this embodiment, for the control channel, a control channel in signal slots defined in mobile communication standards such as PHS and PDC in Japan, and a CDMA system may be used. The control channel is not limited to a fixed control channel, but a traffic channel may be also used for the control channel.

In the following, a description will be given of a case where the PS in the PDC system in Japan is used.

Figure 10A:
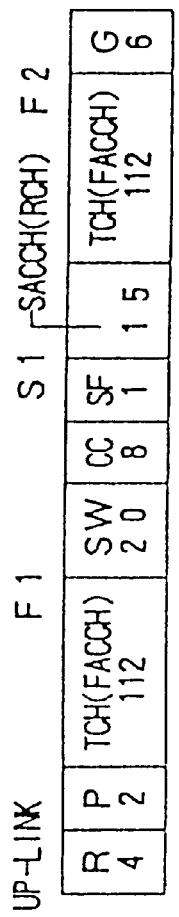
FIG. 10A and FIG. 10B show signal frame formats of up-link and down-link physical channels used in a PDC system.
Figure 10B:
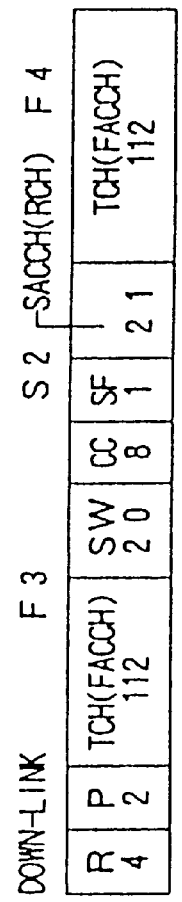

FIG. 10A and FIG. 10B, show signal frame formats of up-link and down-link physical channels used in the PDC system, and FIG. 10C to FIG. 10F show signal frame formats of physical channels used in the PHS in Japan.

In FIG. 10A and FIG. 10B, for communicating speech data, etc., traffic channels (TCHs) are used, but as necessary, the TCHs are used as fast associated control channels (FACCHs) F1 to F4 for transmitting control data. Further, in these signal frame formats, slow associated control channels (SACCHs) S1, S2 are also used for transmitting the control data. Therefore, in this embodiment, the FACCHs F1 to F4 (which are usually used as the traffic channels) and the SACCHs S1, S2 may be used for transmitting the telematique detection signal.

Figure 10C:
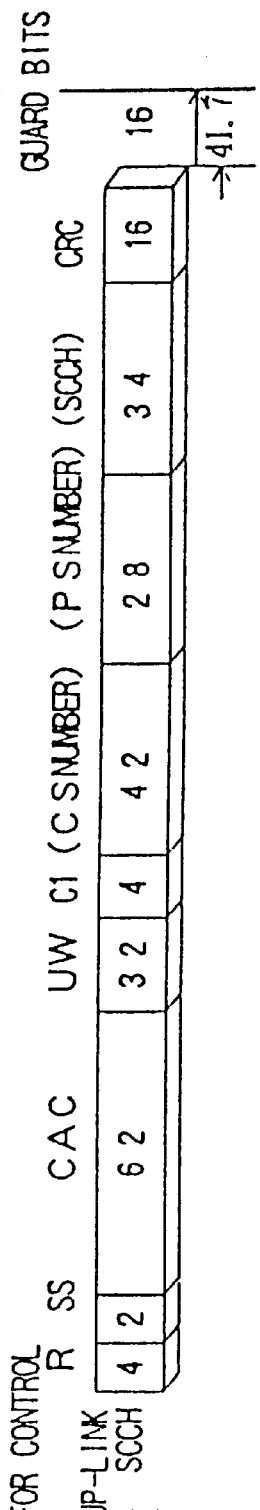
FIG. 10C to FIG. 10F show signal frame formats of physical channels used in a PHS in Japan.
Figure 10D:
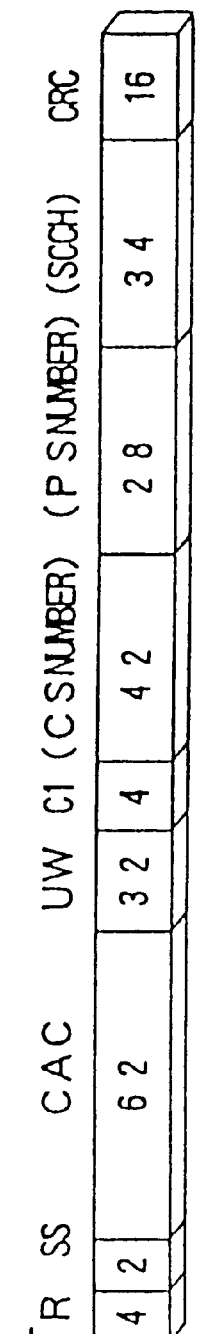
Figure 10E:
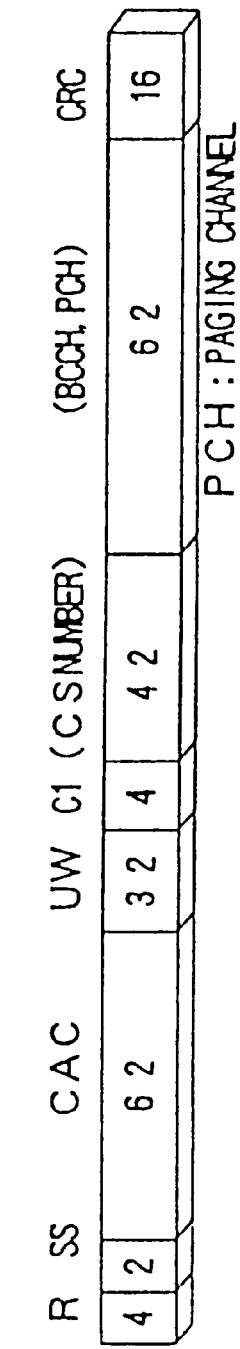
Figure 10F:
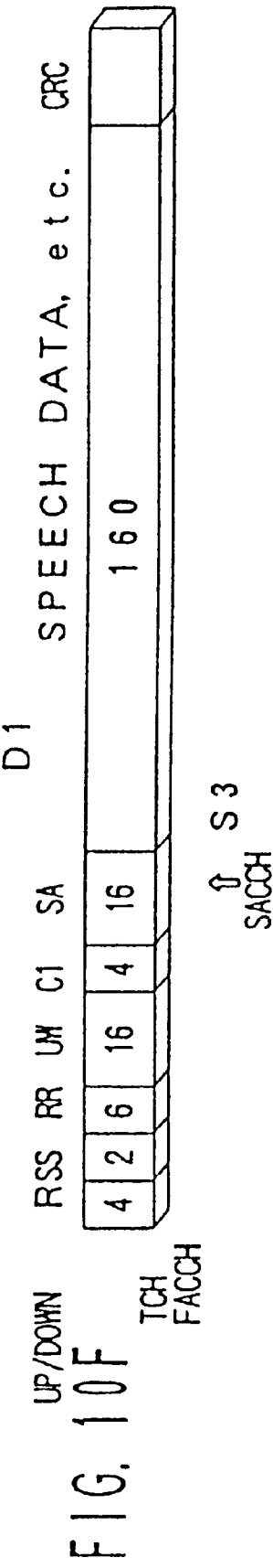

In the case where the portable radio set in the PHS is used for the PS 80 shown in FIG. 9, channels shown in FIG. 10C to FIG. 10F may be used for transmitting the telematique detection signal. FIG. 10C to FIG. 10E show signal frame formats of control physical channels. In FIG. 10C and FIG. 10D, signaling control channels (SCCHs) may be also used, and in FIG. 10E, a broadcast control channel (BCCH) or a paging channel (PCH) may be used. Further, FIG. 10F shows an up-link and down-link traffic physical channel format. In FIG. 10F, an FACCH D1 (which is usually used as the traffic channel (TCH)) and an SACCH S3 may be used for transmitting the telematique detection signal.

In the following, a transmission sequence will be given of a case where the FAX 95 is connected to the PS 80, and the facsimile data is transmitted from the FAX 95 to the FAX 72 in the PSTN 70.

(1) A user of the PS 80 connects the FAX 95 and the ADP 90 to the PS 80 for the FAX transmission and reception;

(2) When the PS 80 detects the connection of the ADP 90, the PS 80 bypasses the CODEC 81 in the PS 80 and connects the ADP 90 to the TDMA processing part 84;

(3) Further, the CONT 87 of the PS 80 transmits a FAX mode signal to the BSC 60. The FAX mode signal may be transmitted with location information which is generally transmitted to the BTS 55 by the PS 80 being in a standby state. Also, the FAX mode signal may be transmitted when the PS 80 transmits a call request.

(4) The MUX/DEMUX 64 demultiplexes the FAX mode signal transmitted from the PS 80, and transmits the signal to the CONT 62; and (5) The CONT 62 controls the SW 65 so as to bypass the CODEC 66, and starts up the DETMOD (for example, 61₁) corresponding to the connection line to establish a connection link.

In the above-discussed sequences, by bypassing the CODECs 81, 66 provided in the PS 80 and the BSC 60, a clear line, through which the FAX signal may be transmitted without being distorted, is established between the FAX 95 in the PS 80 and the FAX 72 in the PSTN 70. As a result, when FAX transmission is carried out from either the PS 80 or the PSTN 70, the FAX transmission and reception may be easily carried out by the conventional sequence used in the facsimile communication. Namely, also in the WLL system, the facsimile transmission and reception may be easily carried out.

Figure 11:
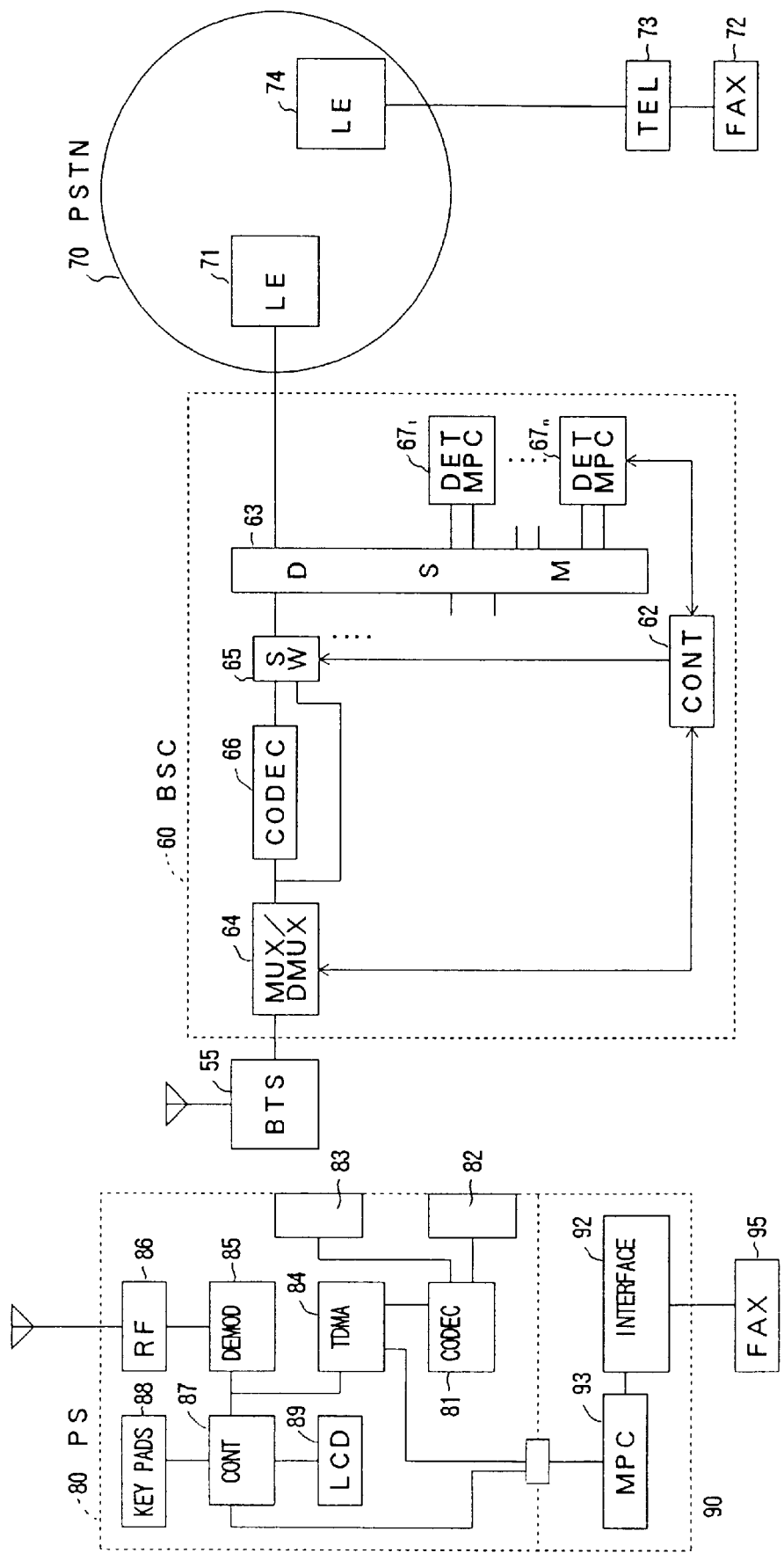
FIG. 11 shows a block diagram of a fourth embodiment of the radio access system for the telematique service according to the present invention.

Next, a description will be given of a fourth embodiment of the radio access system for the telematique service according to the present invention, by referring to FIG. 11. FIG. 11 shows a block diagram of the fourth embodiment of the radio access system for the telematique service according to the present invention. In order to prevent an error from occurring in the radio path, it is preferred that the modem protocol in the PSTN is changed only in the radio path. In this case, as shown in FIG. 11, instead of the MODEM 91 in the ADP 90, an MPC 93 is used. The MPC 93 has a function of converting between a standard FAX interface in the PSTN and a dedicated radio FAX interface in the radio path, and a MODEM function. Further, in the BSC 60, instead of the DETMODs 61₁ to 61ₙ, the DETMPCs 67₁ to 67ₙ having the MODEM function and the MPC function are provided.

In the following, a description will be given of the FAX transmission-and-reception sequence in the above-discussed system.

(1) A user of the PS 80 connects the FAX 95 and the ADP 90 to the PS 80 for the FAX transmission and reception;

(2) When the PS 80 detects the connection of the ADP 90, the PS 80 bypasses the CODEC 81 in the PS 80;

(3) Further, the PS 80 transmits a FAX mode signal to the BSC 60. The FAX mode signal may be transmitted with location information which is generally transmitted to the BTS 55 by the PS 80 being in a standby state. Also, the FAX mode signal may be transmitted when the PS 80 transmits a call request.

(4) The MUX/DEMUX 64 demultiplexes the FAX mode signal transmitted from the PS 80, and transmits the signal to the CONT 62;

(5) Further, the BSC 60 starts up the DETMPC (for example, 67₁) corresponding to the connection line to terminate the radio FAX interface in the connection line; and (6) The CONT 62 controls the SW 65 so as to bypass the CODEC 66.

In the above-discussed sequences, by bypassing the CODECs 81, 66 provided in the PS 80 and the BSC 60, the modem protocol is converted in the radio path, and, thus, an errorless line, through which the FAX signal may be transmitted without being distorted, is established between the FAX 95 in the PS 80 and the FAX 72 in the PSTN 70. As a result, when FAX transmission is carried out from either the PS 80 or the PSTN 70, the FAX transmission and reception may be easily carried out by the conventional sequence used in the facsimile communication. Namely, also in the WLL system, the facsimile transmission and reception may be easily carried out.

In the above-discussed embodiments, the transmission sequences with respect to the facsimile data have been given. Also with respect to modem data (for example, modem data for a personal computer communication), in the same way, the data transmission and reception may be carried out.

In general, a number of lines for the telematique communication is less than a number of lines for the telephone communication. Therefore, in FIG. 4, FIG. 8, and FIG. 9, it is preferred that a number of the DETMODs $61_1$ to $61_n$ and a number of the DETMPCs $67_1$ to $67_n$ are less than a number of connection lines to which the DSM 63 is connected. Accordingly, the DETMODs $61_1$ to $61_n$ and the DETMPCs $67_1$ to $67_n$ may be efficiently used.

Figure 12:
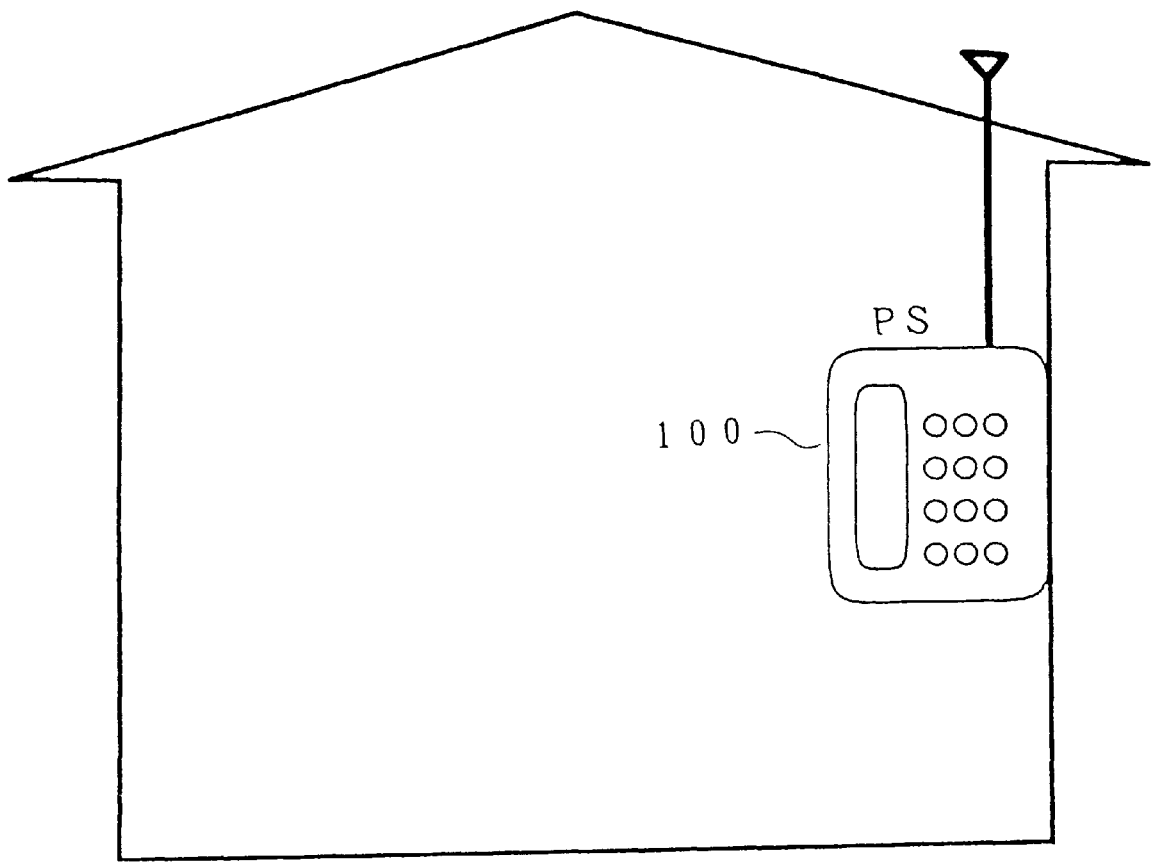
FIG. 12 shows an illustration for explaining a terminal device in the WLL system.
Figure 13:
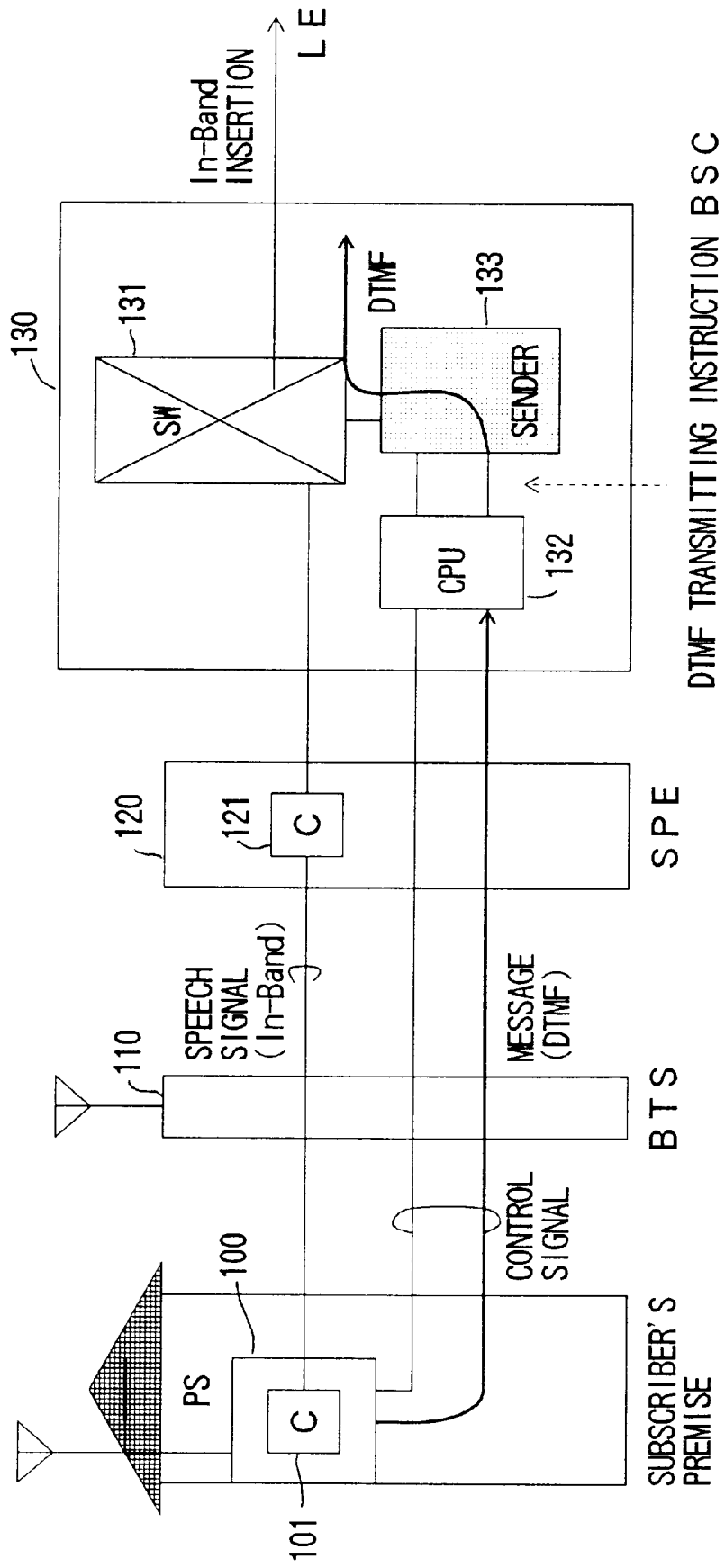
FIG. 13 shows a block diagram of a fifth embodiment of the radio access system for the telematique service according to the present invention.

Next, a description will be given of a fifth embodiment of the radio access system for the telematique service according to the present invention, by referring to FIG. 12 and FIG. 13. FIG. 12 shows an illustration for explaining a terminal device in the WLL system, and FIG. 13 shows a block diagram of the fifth embodiment of the radio access system for the telematique service according to the present invention. In the fifth embodiment, a DTMF signal may be positively transmitted and received using the PS.

In FIG. 12, a portable set (PS) 100 is provided in the subscriber's premise. In the following, a description will be given of sequences in a case where the DTMF signal is transmitted on the up-link radio line when, for example, reserving an airline ticket, by referring to FIG. 13.

In FIG. 13, first a user calls from the PS 100 to a ticket reservation center through the PSTN. After a communication link is established, numeric keys "0" to "9", "*", and "#" are operated for the ticket reservation. At this time, speech data passed through a CODEC 101 is transmitted to a BTS 110 on a traffic channel, is provided to a switching part (SW) 131 in a BSC 130 through a CODEC 121 in speech processing equipment (SPE) 120, and is transmitted from the SW 131 to the LE in the PSTN.

On the other hand, operating information of the numeric keys is transmitted as a control command on a control channel to a CPU 132 in the BSC 130 through a BTS 110 and the SPE 120. The SPE 120 is constructed with the CODEC 121 which is separated from the BSC 130. The operating information on the control channel is not passed through the CODEC 121.

When the CPU 132 (constituting sixth and seventh control parts) receives the control command on the control channel, the CPU 132 controls a sender 133 (constituting a first generation part) to generate the DTMF signal indicated by the control command. The DTMF signal generated in the sender 133 is inserted into speech data (In-Band) in a switching part (SW) 131, and is transmitted toward the LE in the PSTN.

Figure 14:
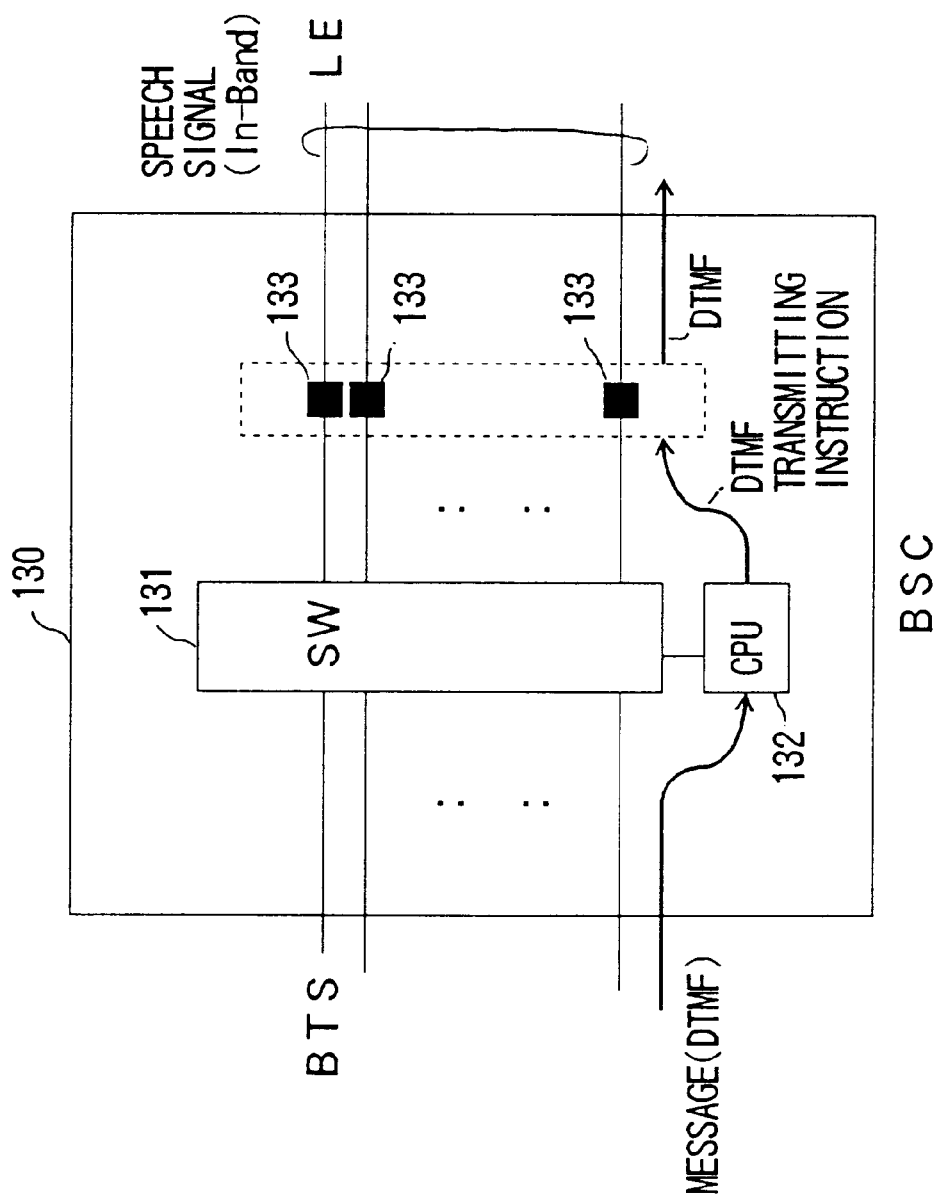
FIG. 14 shows an illustration for explaining a configuration example of a sender shown in FIG. 13.

FIG. 14 shows an illustration for explaining a configuration example of the sender 133 shown in FIG. 13. As shown in FIG. 14, the sender 133 shown in FIG. 13 may have a plurality of senders corresponding to all channels between the BSC 130 and the LE. However, since in practical use, transmission of the DTMF signal is not simultaneously carried out on all channels, a number of the senders which may be provided is approximately one tenth of the number of usable channels.

Figure 15:
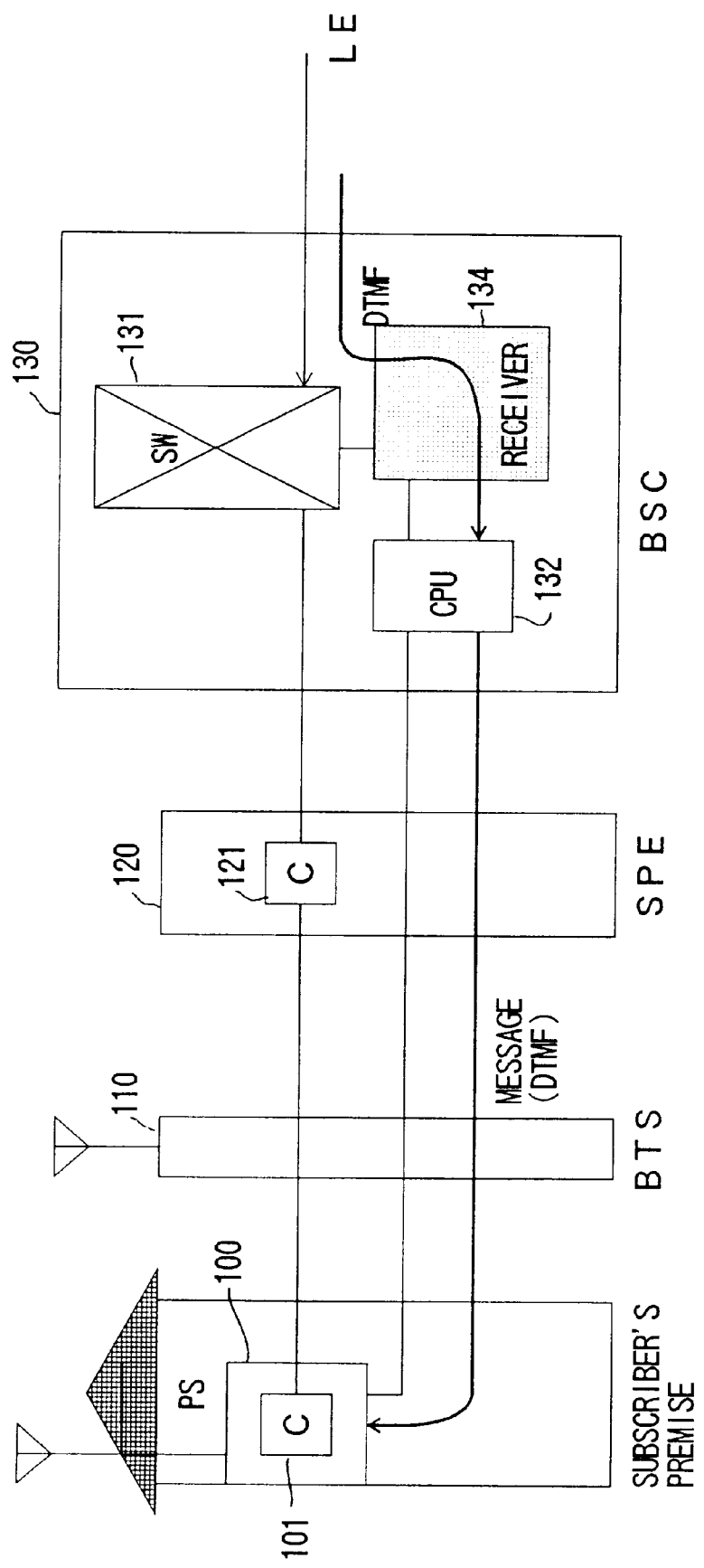
FIG. 15 shows a block diagram of a sixth embodiment of the radio access system for the telematique service according to the present invention.

Next, a description will be given of a sixth embodiment of the radio access system for the telematique service according to the present invention, by referring to FIG. 15. FIG. 15 shows a block diagram of the sixth embodiment of the radio access system for the telematique service according to the present invention.

In the following, a description will be given of sequences in a case where the DTMF signal is transmitted on the down-link radio line when, for example, remote-controlling the PS to reproduce a speech signal stored in an answer phone.

In FIG. 15, first a user calls the PS 100 through the PSTN. After a communication link is established, numeric keys are operated for reproducing the speech signal stored in the answer phone PS. At this time, in general, the speech data is provided from the LE in the PSTN to the SW 131 in the BSC 130, and is provided from the SW 131 to a receiver 134 (constituting a fourth detection part). Subsequently, the speech data is coded by the CODEC 121 in the SPE 120, and is transmitted from the BTS 110 to the PS 100. Coded speech data thus received is decoded by the CODEC 101 in the PS 100, and is produced from a speaker as an analog speech signal.

On the other hand, when the DTMF signal inserted into the normal speech data is provided from the SW 131 to the receiver 134, the DTMF signal is detected by the receiver 134. The receiver 134 informs detection of the DTMF signal to the CPU 132. The CPU 132 transmits a DTMF message from the SW 131 to the PS 100 through the SPE 120 and the BTS 110 on the control channel. At this time, the signal on the control channel does not pass through the CODEC 121 in the SPE 120 and the CODEC 101 in the PS 100. Finally, in the CONT of the PS 100, the DTMF message is detected, and the stored speech signal is reproduced.

In this way, between the PS 100 and the LE in the PSTN connected to the BSC 130, the DTMF signal may be positively transmitted without being distorted due to the CODEC. As a result, for example, the ticket reservation and the remote control operation of the answer phone may be easily carried out in the WLL system.

Figure 16:
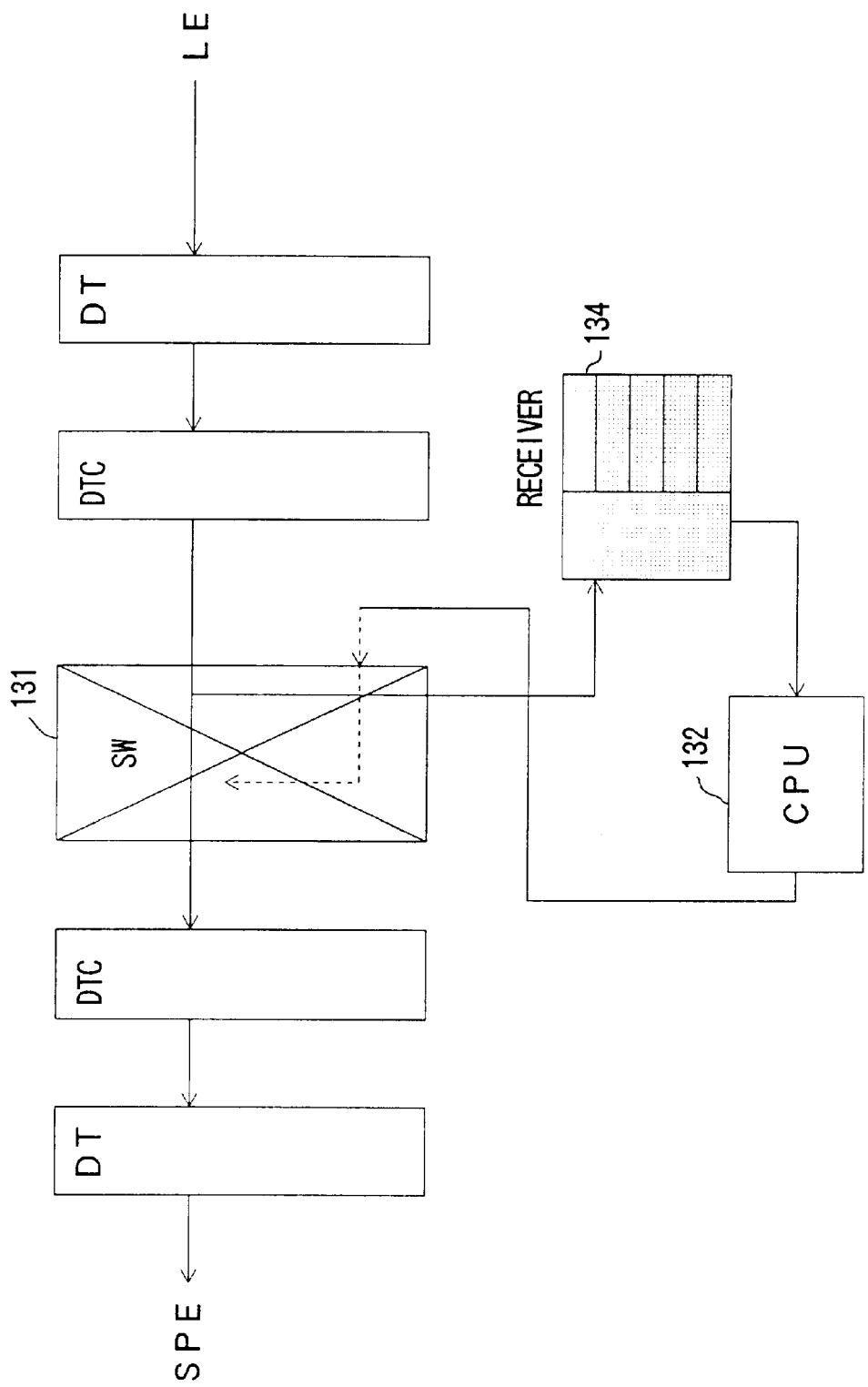
FIG. 16 and FIG. 17 show configuration examples of a receiver shown in FIG. 15.
Figure 17:
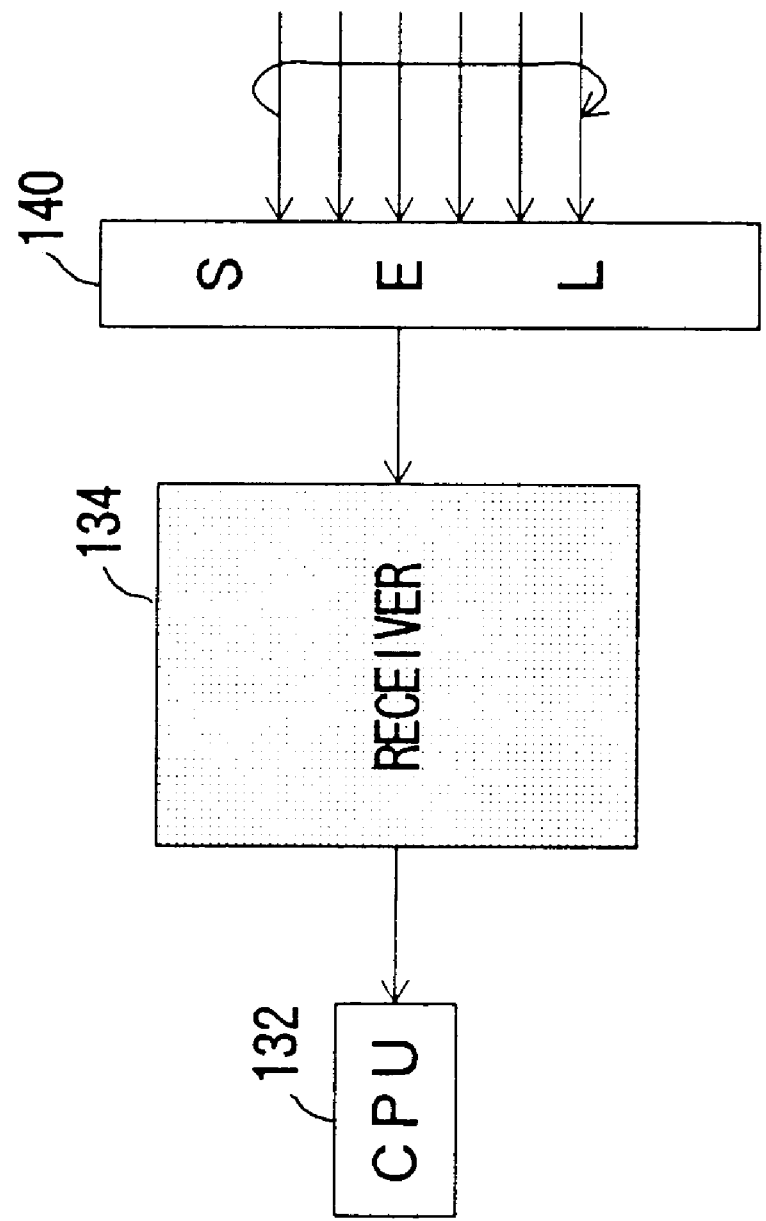

FIG. 16 and FIG. 17 show configuration examples of the receiver 134 shown in FIG. 15. In FIG. 16, the receiver 134 having a plurality of receiver parts is provided with all channel signals connected to the SW 131, and detects the DTMF signal for each channel to inform a detection result to the CPU 132. In FIG. 17, instead of providing the receiver 134 corresponding to all channels, one of the channels connected to the SW 131 is selected by a selector (SEL) 140, and is provided to the single receiver 134. This is referred to as a poling function. Further, the receivers whose number is determined by a traffic condition may be provided.

Figure 18:
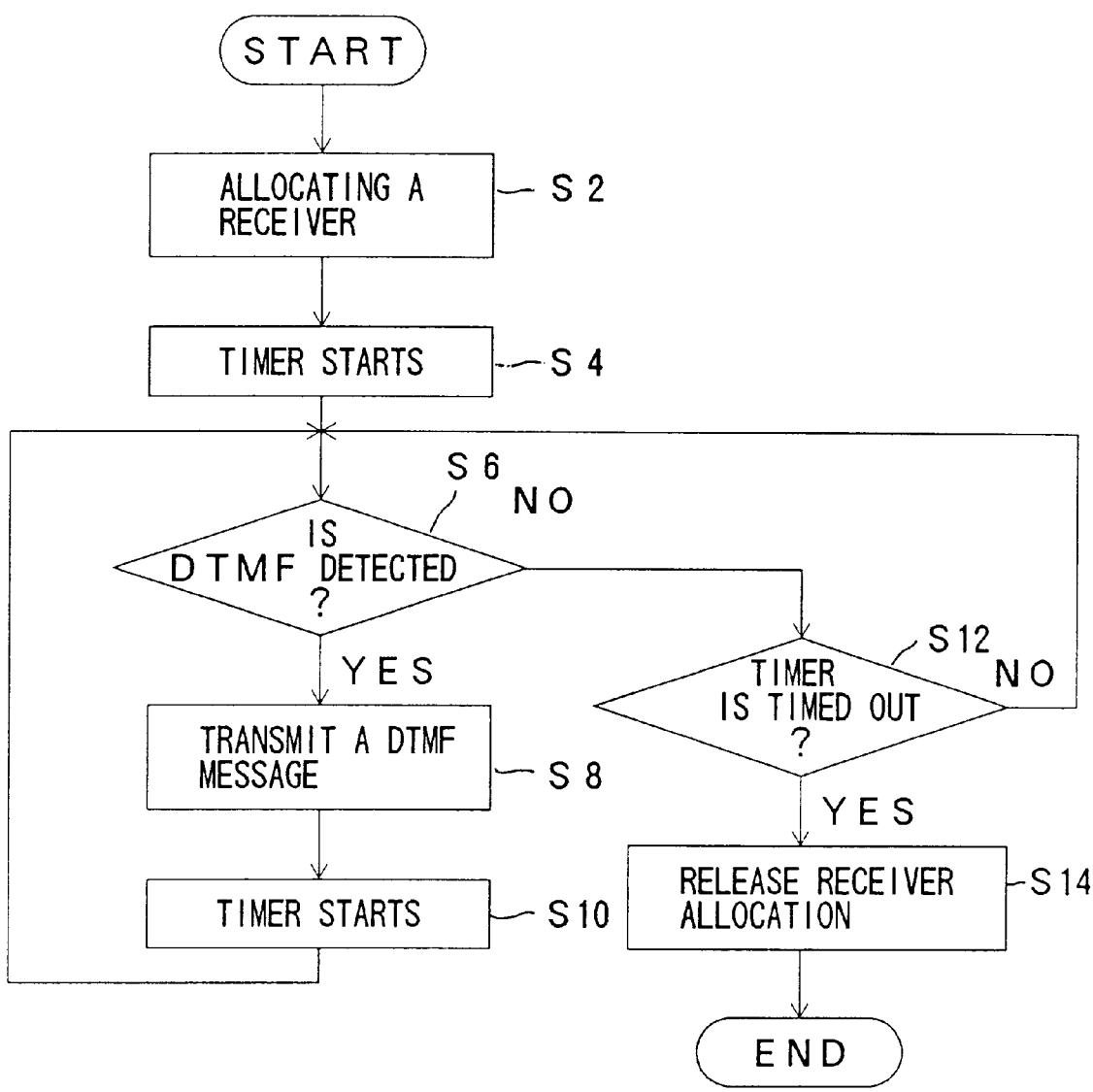
FIG. 18 shows a flowchart of a first embodiment of a receiver allocating process using a timer.

FIG. 18 shows a flowchart of a first embodiment of a receiver allocating process using a timer. The process is carried out for each receiver. In FIG. 18, in step S2, a receiver is allocated to a channel on a connected line, and in step S4, a timer corresponding to the receiver starts.

In step S6, on the channel to which the receiver is allocated, whether the DTMF signal is provided or not is detected. When the DTMF signal is detected, in step S8, the DTMF message is transmitted from the CPU 132. After that, in step S10, the timer is reset to an initial value to be restarted, and the process proceeds to step S6.

On the other hand, if the DTMF signal is not detected in the step S6, in step S12, whether the timer is timed out or not is detected. When the timer is not yet timed out, the process proceeds to the step S6. When the timer is timed out, the process proceeds to step S14, allocation of the receiver to the corresponding channel is released, and the process is finished. Then, the same receiver is allocated to another channel on a connected line.

Figure 19:
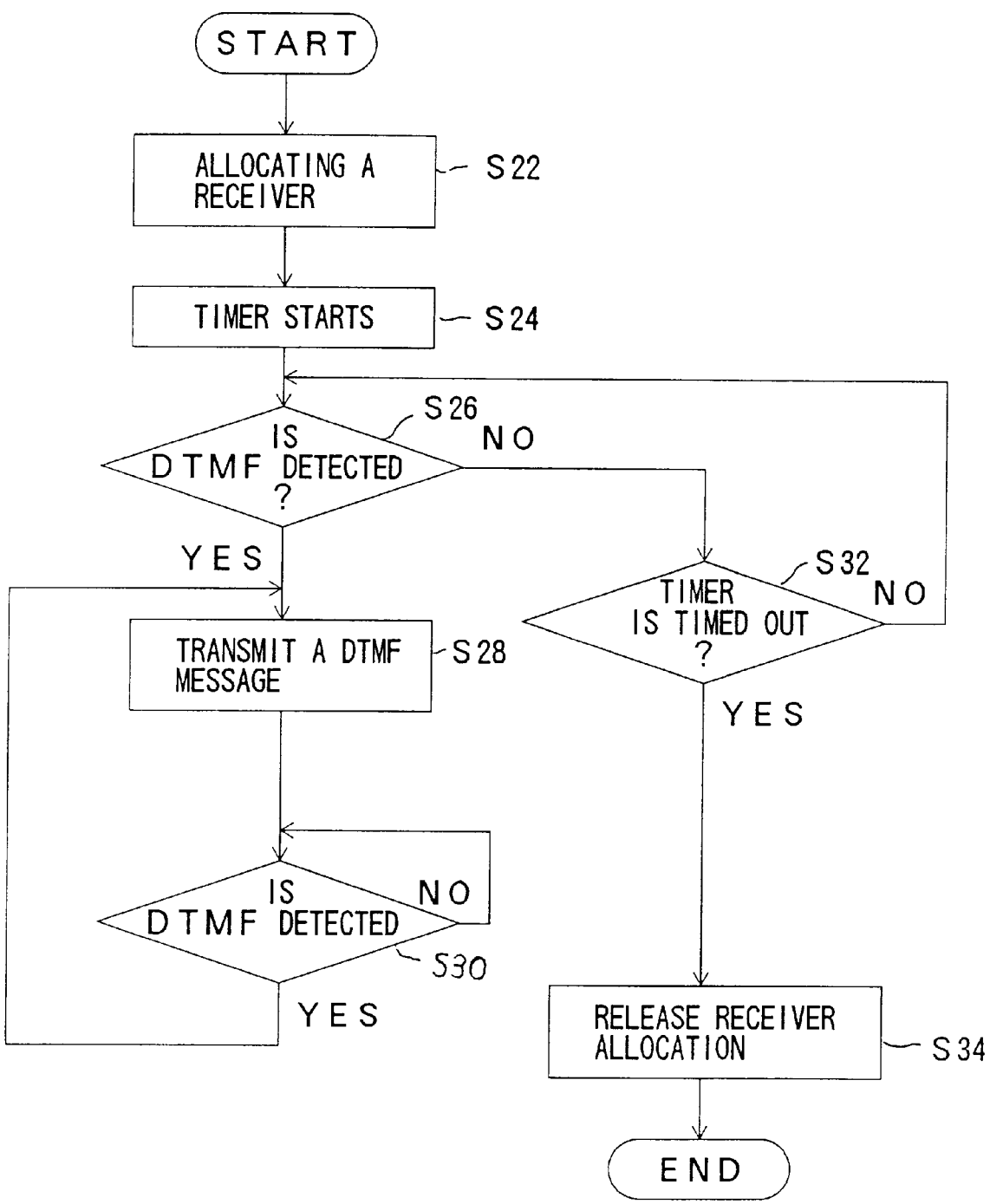
FIG. 19 shows a flowchart of a second embodiment of the receiver allocating process using the timer.

FIG. 19 shows a flowchart of a second embodiment of the receiver allocating process using the timer. The process is carried out for each receiver. In FIG. 19, in step S22, a receiver is allocated to a channel on a connected line, and in step S24, a timer corresponding to the receiver starts.

In step S26, on the channel to which the receiver is allocated, whether the DTMF signal is provided or not is detected. When the DTMF signal is detected, in step S28, the DTMF message is transmitted from the CPU 132. After that, in step S30, whether the DTMF signal is provided or not is detected. When the DTMF signal is detected, the process proceeds to step S28. When the DTMF signal is not detected, the step S30 is repeated.

On the other hand, in the step S26, when the DTMF signal is not detected, in step S32, whether the timer is timed out or not is detected. When the timer is not yet timed out, the process proceeds to the step S26. When the timer is timed out, the process proceeds to step S34, allocation of the receiver to the corresponding channel is released, and the process is finished. Then, the same receiver is allocated to another channel on a connected line.

Figure 20:
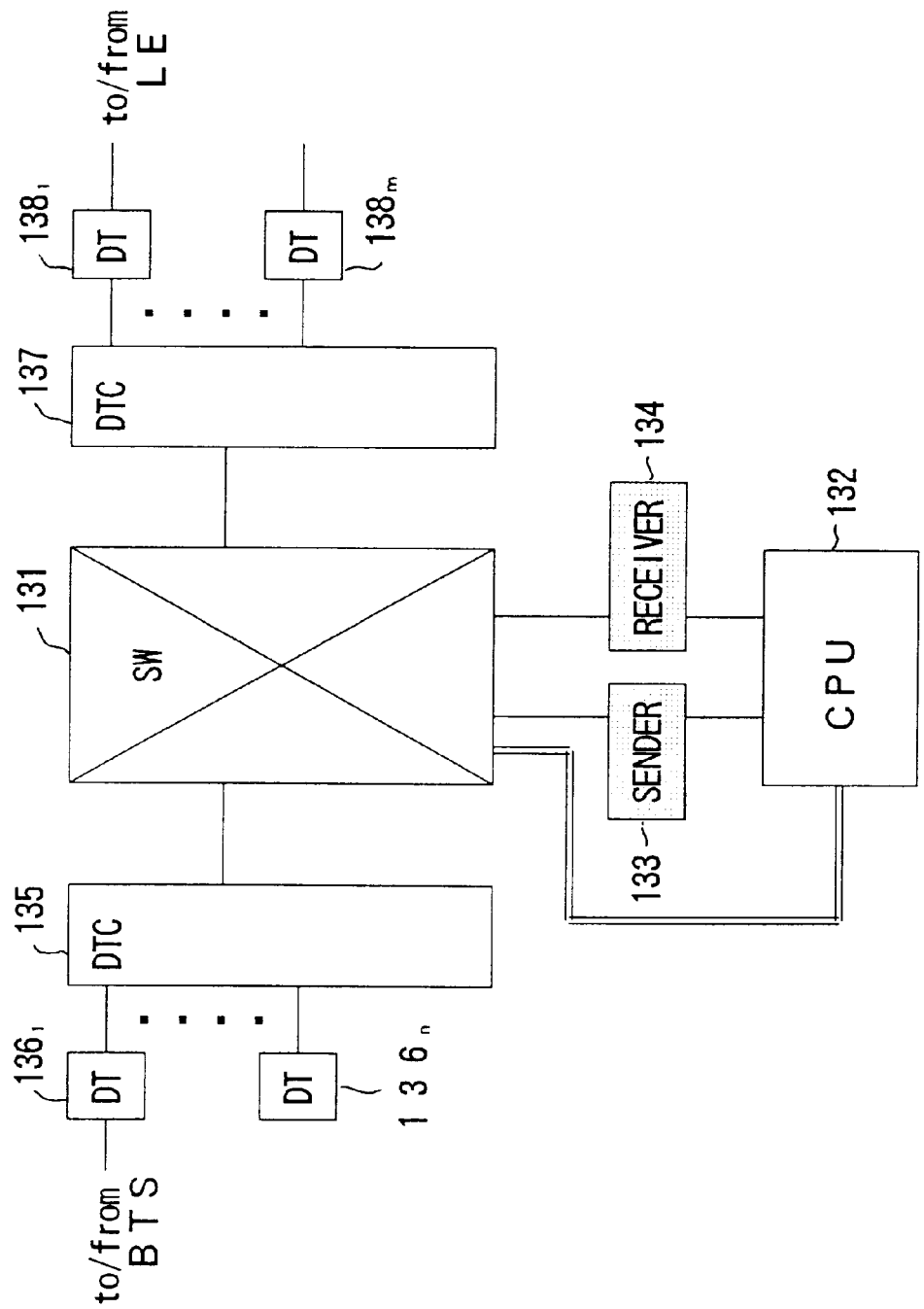
FIG. 20 shows a block diagram of a base station controller BSC.

FIG. 20 shows a block diagram of the BSC 130. In FIG. 20, digital terminals in a speech processing system (DTs) $136_1$ to $136_n$ are respectively connected to lines to/from the base terminal stations. The DTs $136_1$ to $136_n$ are connected to the SW 131 through a digital terminal common part (DTC) 135 which carries out multiplexing-and-demultiplexing operations for the lines. Each of DTs $138_1$ to $138_m$ is connected to a line to/from the local subscriber exchanger (LE) in the PSTN. The DTs $138_1$ to $138_m$ are connected to the SW 131 through a digital terminal common part (DTC) 137 which carries out multiplexing-and-demultiplexing operations for the lines.

The SW 131 has a time switch function, and carries out a process of changing time slots provided from the DTCs 135, 137. To the SW 131, the central processing unit (CPU) 132, the sender 133, and the receiver 134 are connected. The CPU 132 analyzes a message and a command provided from the BTS and the LE, and generates a message and a command to be provided to the BTS and the LE. Further, the CPU 132 controls the SW 131. The sender 133 generates the DTMF signal under the control of the CPU 132, and provides the signal to a given line channel of the SW 131. The receiver 134 detects the DTMF signal transmitted through a line channel provided from the SW 131, and informs the CPU 132 of the detection of the DTMF signal.

Figure 21:
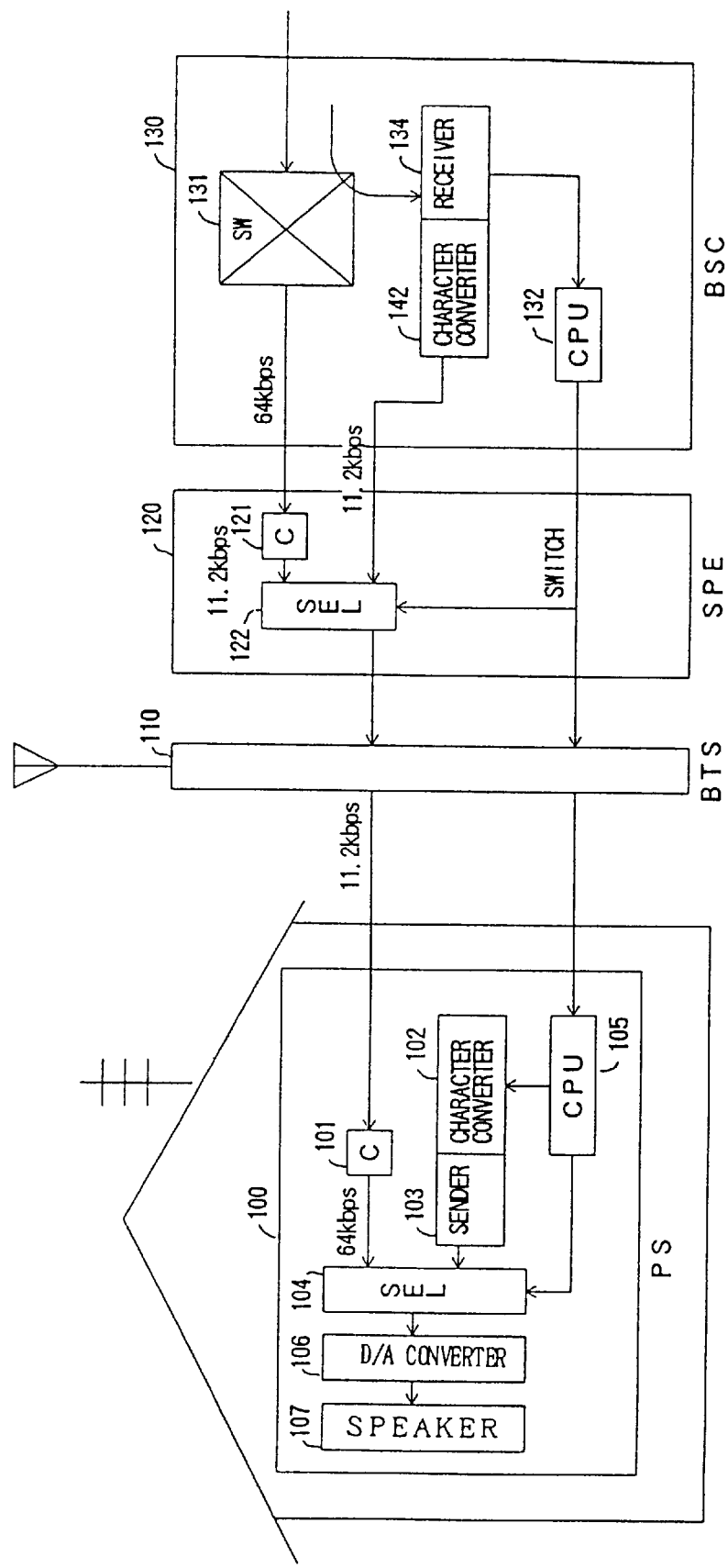
FIG. 21 shows a block diagram of a seventh embodiment of the radio access system for the telematique service according to the present invention.

Next, a description will be given of a seventh embodiment of the radio access system for the telematique service according to the present invention, by referring to FIG. 21. FIG. 21 shows a block diagram of the seventh embodiment of the radio access system for the telematique service according to the present invention. In the seventh embodiment, the DTMF signal may be positively transmitted from the PSTN side to the PS side.

In FIG. 21, speech data provided from the LE in the PSTN to the SW 131 in the BSC 130 is transmitted to the SPE 120 from the SW 131 on, for example, 64-kbps fast traffic channel. Also, the speech data is provided from the SW 131 to the receiver 134 to detect the DTMF signal. When the DTMF signal is detected, the receiver 134 informs the CPU 132 and a character converter 142 of the detection of the DTMF signal. The character converter 142 converts the DTMF signal to character data, and transmits the character data to the SPE 120 on, for example, an 11.2-kbps low-rate traffic channel. In response to the information of the DTMF signal detection, the CPU 132 generates a control command, and transmits the control command on a control channel to the SPE 120.

In the SPE 120, the fast traffic channel is speech-coded by the CODEC 121, for example, is converted to an 11.2-kbps low-rate traffic channel, and is provided to the SEL 122. On the other hand, the low-rate traffic channel transmitting the character data is provided to the SEL 122 without passing through the CODEC 121. In general, the SEL 122 selects the traffic channel from the CODEC 121 according to the control command on the control channel. When the DTMF signal is transmitted, the SEL 122 selects the traffic channel transmitting the character data of the DTMF signal produced from the character converter 142. The selected traffic channel with the control channel is transmitted to the PS 100 through the BTS 110.

In the PS 100, the traffic channel is provided to the CODEC 101 and a character converter 102. The CODEC 101 decodes the speech data to, for example, 64-kbps speech data, and provides it to a selector (SEL) 104. When the character converter 102 detects the character data of the DTMF signal, the character converter 102 informs detection of the DTMF signal to a sender 103 (constituting a second generation part). The sender 103 generates speech data of the DTMF signal corresponding to the character, and provides the speech data to the SEL 104.

When a CPU 105 (constituting an eighth control part) receives a control command of the control channel transmitted from the BTS 110, the CPU 105 allows the character converter 102 to operate, and controls the SEL 104 to switch. Thus, in a normal state, the SEL 104 selects the speech data from the CODEC 101, and when the DTMF signal is transmitted, the SEL 104 selects the speech data of the DTMF signal. The selected speech data is provided to a digital to analog converter (D/A converter) 106. In the D/A converter 106, the speech data is converted to an analog speech signal, and is provided to a speaker 107.

Figure 22:
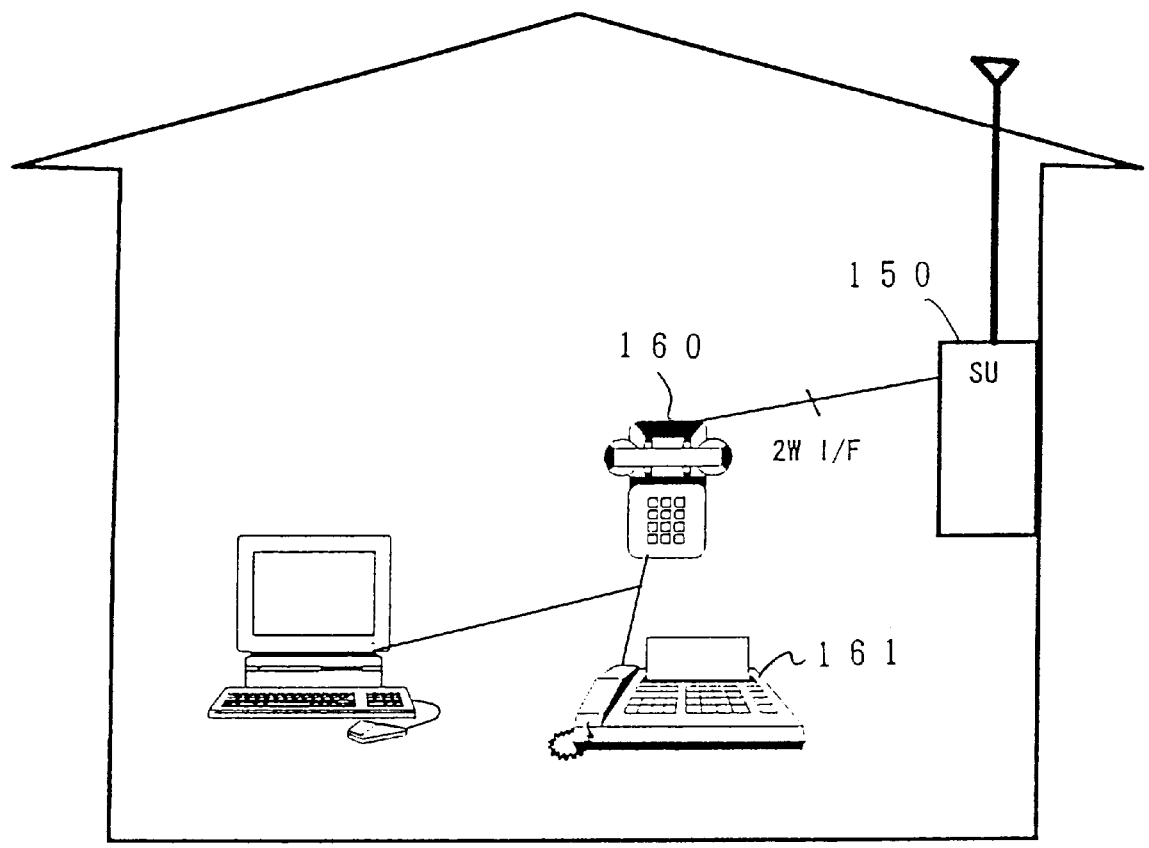
FIG. 22 shows an illustration for explaining a terminal device in the WLL system.

Next, a description will be given of an eighth embodiment of the radio access system for the telematique service according to the present invention, by referring to FIG. 22 and FIG. 23. FIG. 22 shows an illustration for explaining a terminal device in the WLL system, and FIG. 23 shows a block diagram of the eighth embodiment of the radio access system for the telematique service according to the present invention.

In FIG. 22, a subscriber unit (SU) 150 is provided in the subscriber's premise. To the SU 150, a telephone (TEL) 160, a facsimile (FAX) 161, etc., are connected.

In the following, a description will be given of sequences in a case where the DTMF signal is transmitted from the TEL 160 to the up-link radio line, by referring to FIG. 23.

Figure 23:
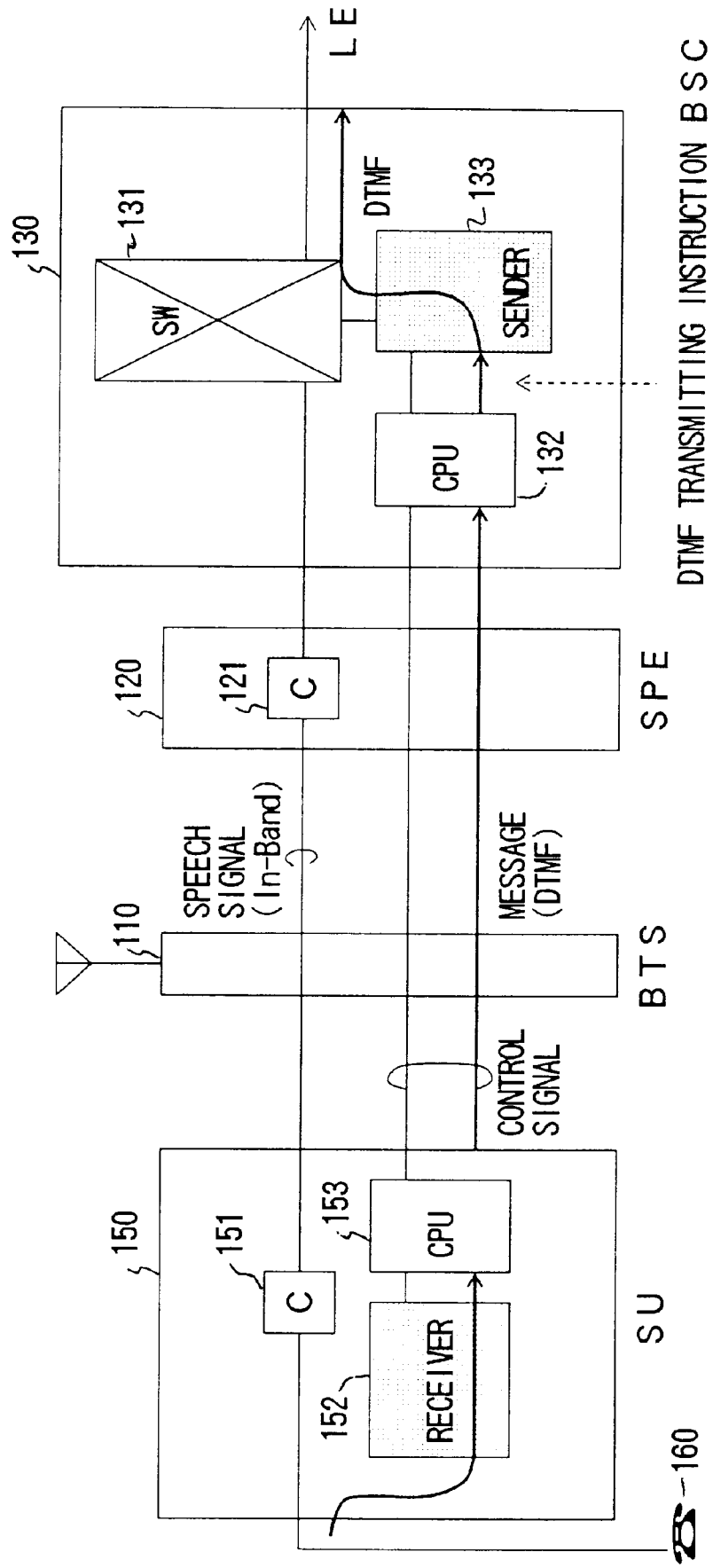
FIG. 23 shows a block diagram of an eighth embodiment of the radio access system for the telematique service according to the present invention.

In FIG. 23, a speech signal produced from the TEL 160 is provided to a CODEC 151 and a receiver 152 in the SU 150. The CODEC 151 carries out a speech coding to generate speech data. The speech data is transmitted to the BTS 110 on a traffic channel, is provided to the SW 131 in the BSC 130 through the CODEC 121, and is transmitted from the SW 131 toward the LE in the PSTN. When the receiver 152 detects the DTMF signal, the receiver 152 informs a CPU 153 of the detection of the DTMF signal. In response to the information of the DTMF-signal detection, the CPU 153 generates a control command, and transmits the control command on a control channel to the CPU 132 through the BTS 110, the SPE 120, and the SW 131 in the BSC 130. The control command on the control channel does not pass through the CODEC 121.

When the CPU 132 receives the control command on the control channel, the CPU 132 controls the sender 133 to generate the DTMF signal indicated by the control command. The DTMF signal generated in the sender 133 is inserted into speech data (In-Band) in the switching part (SW) 131, and is transmitted toward the LE in the PSTN.

Figure 24:
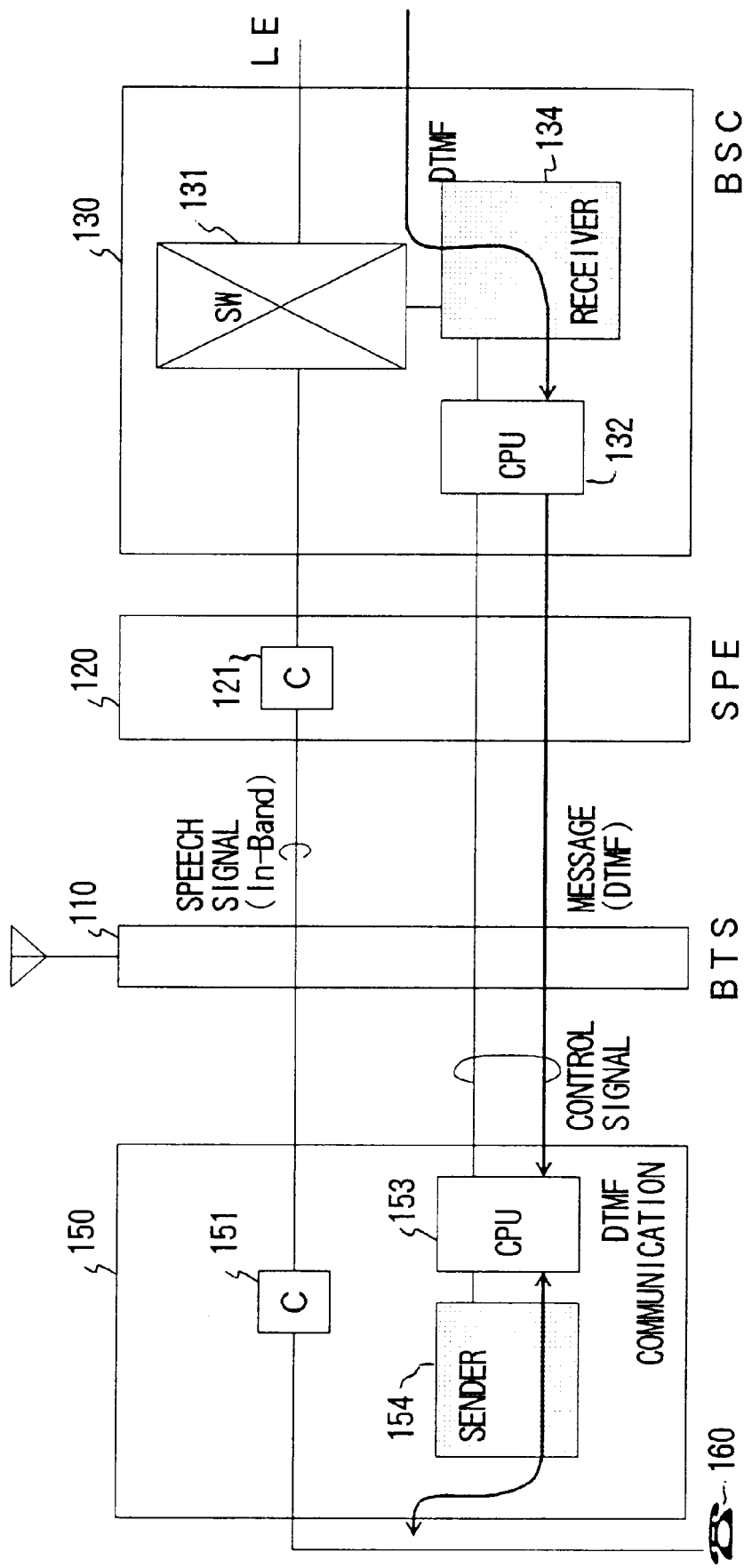
FIG. 24 shows a block diagram of a ninth embodiment of the radio access system for the telematique service according to the present invention.

Next, a description will be given of a ninth embodiment of the radio access system for the telematique service according to the present invention, by referring to FIG. 24. FIG. 24 shows a block diagram of the ninth embodiment of the radio access system for the telematique service according to the present invention.

In the following, a description will be given of sequences in a case where the DTMF signal is transmitted on the down-link radio line from the telephone TEL in the PSTN to the TEL 160 in the SU 150.

In FIG. 24, first a user calls the SU 150 through the PSTN. After a communication link is established, numeric keys are operated for reproducing the speech signal stored in the answer phone. At this time, in general, the speech data is provided from the LE in the PSTN to the SW 131 in the BSC 130, and is provided from the SW 131 to the receiver 134. Subsequently, the speech data on the TCH is coded by the CODEC 121 in the SPE 120, and is transmitted from the BTS 110 to the SU 150. Coded speech data thus received is decoded by the CODEC 151 in the SU 150, and is produced from a speaker of the TEL 160 connected to the SU 150 as an analog speech signal.

On the other hand, when the DTMF signal inserted into the normal speech data is provided from the SW 131 to the receiver 134, the DTMF signal is detected by the receiver 134. The receiver 134 informs the CPU 132 of the detection of the DTMF signal. The CPU 132 transmits a DTMF message from the SW 131 to the SU 150 through the SPE 120 and the BTS 110 on the control channel. At this time, the signal on the control channel does not pass through the CODEC 121 in the SPE 120 and the CODEC 151 in the SU 150, and is provided to the CPU 153. When the CPU 153 receives the control command on the control channel, the CPU 153 generates the DTMF signal according to the control command for a sender 154. Finally, the DTMF signal is provided to the TEL 160.

In this way, between the SU 150 and the LE in the PSTN connected to the BSC 130, the DTMF signal may be positively transmitted without being distorted due to the CODEC. As a result, for example, the ticket reservation and the remote control operation of the answer phone may be easily carried out in the WLL system.

Figure 25:
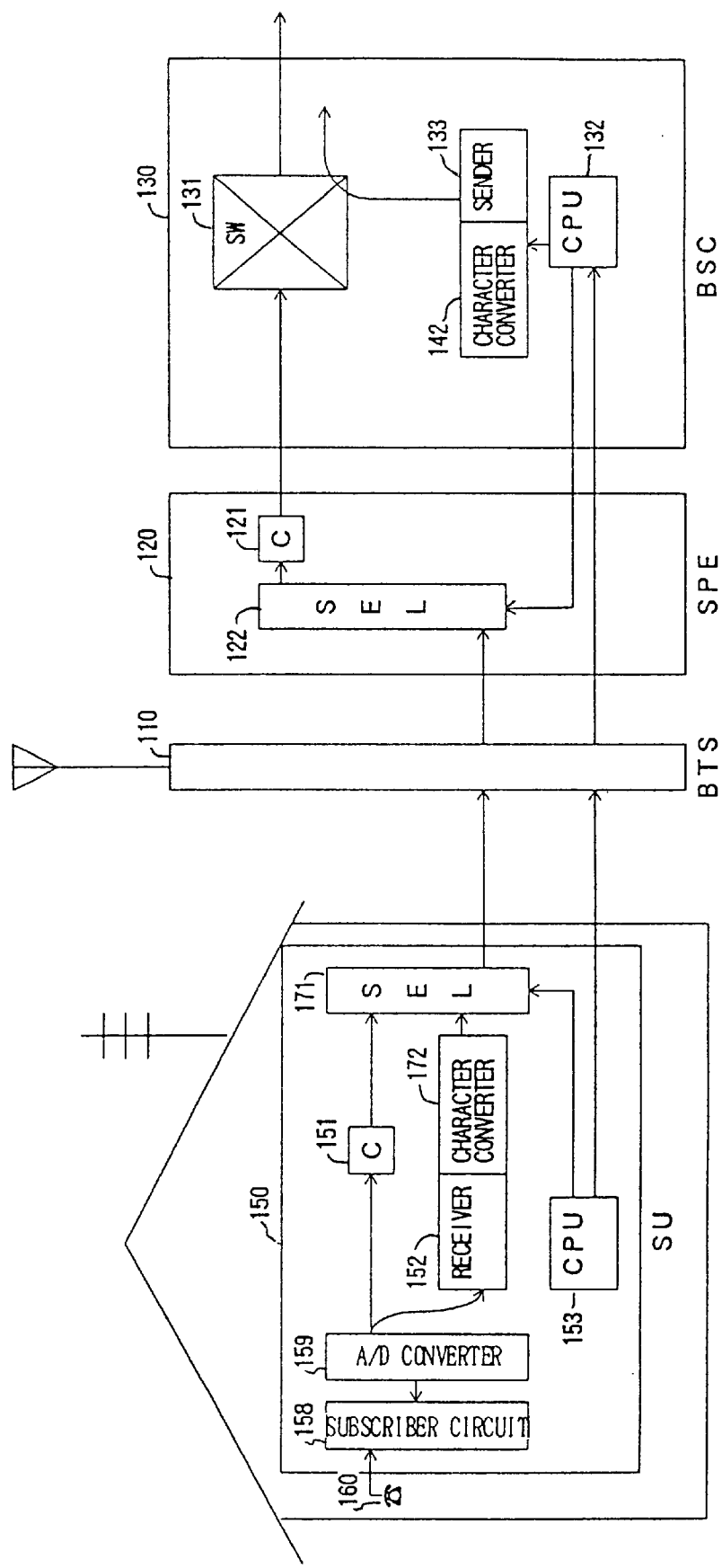
FIG. 25 shows a block diagram of a tenth embodiment of the radio access system for the telematique service according to the present invention.

Next, a description will be given of a tenth embodiment of the radio access system for the telematique service according to the present invention, by referring to FIG. 25. FIG. 25 shows a block diagram of the tenth embodiment of the radio access system for the telematique service according to the present invention.

In the following, a description will be given of sequences in a case where the DTMF signal is transmitted on the up-link radio line from the TEL 160 in the SU 150.

In FIG. 25, a speech signal produced from the TEL 160 is provided to an analog-to-digital converter (A/D converter) 159 to be digitized, and is provided to the CODEC 151 and the receiver 152. The CODEC 151 (constituting a first speech coding and decoding part) processes speech coding of the speech data at, for example, an 11.2-kbps rate. The 11.2-kbps coded speech data is transmitted on a traffic channel to the SPE 120 through the BTS 110 by a selector (SEL) 171, and is provided to the CODEC 121 by a selector (SEL) 122 in the SPE 120.

The 11.2-kbps coded speech data is decoded in the CODEC 121 to produce, for example, 64-kbps speech data. The 64-kbps speech data is provided to the SW 131 in the BSC 130, and is transmitted from the SW 131 toward the LE in the PSTN.

When the receiver 152 (constituting a third detection part) detects the DTMF signal, the receiver 152 informs the CPU 153 and a character converter 172 of the detection of the DTMF signal. The character converter 172 converts the information of the DTMF-signal detection to character data of the DTMF signal, and supplies the character data on, for example, an 11.2-kbps low-rate traffic channel from the SEL 171 to the SPE 120 through the BTS 110.

When the CPU 153 (constituting ninth and twelfth control parts) receives the information of the DTMF-signal detection, the CPU 153 generates a control command, and transmits the control command on a control channel to the CPU 132 in the BSC 130 through the BTS 110, the SPE 120, and the SW 131 in the BSC 130.

When the CPU 132 (constituting tenth and eleventh control parts) receives the control command on the control channel, the CPU 132 allows the character converter 142 to operate, and controls the SEL 122 in the SPE 120 to switch. In a normal state, the SEL 122 supplies a signal on the traffic channel to the CODEC 121 (constituting a second speech coding and decoding part). The speech data is decoded by the CODEC 121 to produce, for example, 64-kbps speech data, and is transmitted toward the LE in the PSTN through the SW 131 in the CPU 132.

However, in the above-discussed switching control, the SEL 122 supplies the character data of the DTMF signal on the traffic channel to a character converter 142 in the BSC 130 by bypassing the CODEC 121. When the character converter 142 detects the character data of the DTMF signal, the character converter 142 informs the sender 133 of the detection of the DTMF signal. The sender 133 generates speech data of the DTMF signal corresponding to the character data, and transmits the speech data toward the LE in the PSTN through the SW 131.

Figure 26:
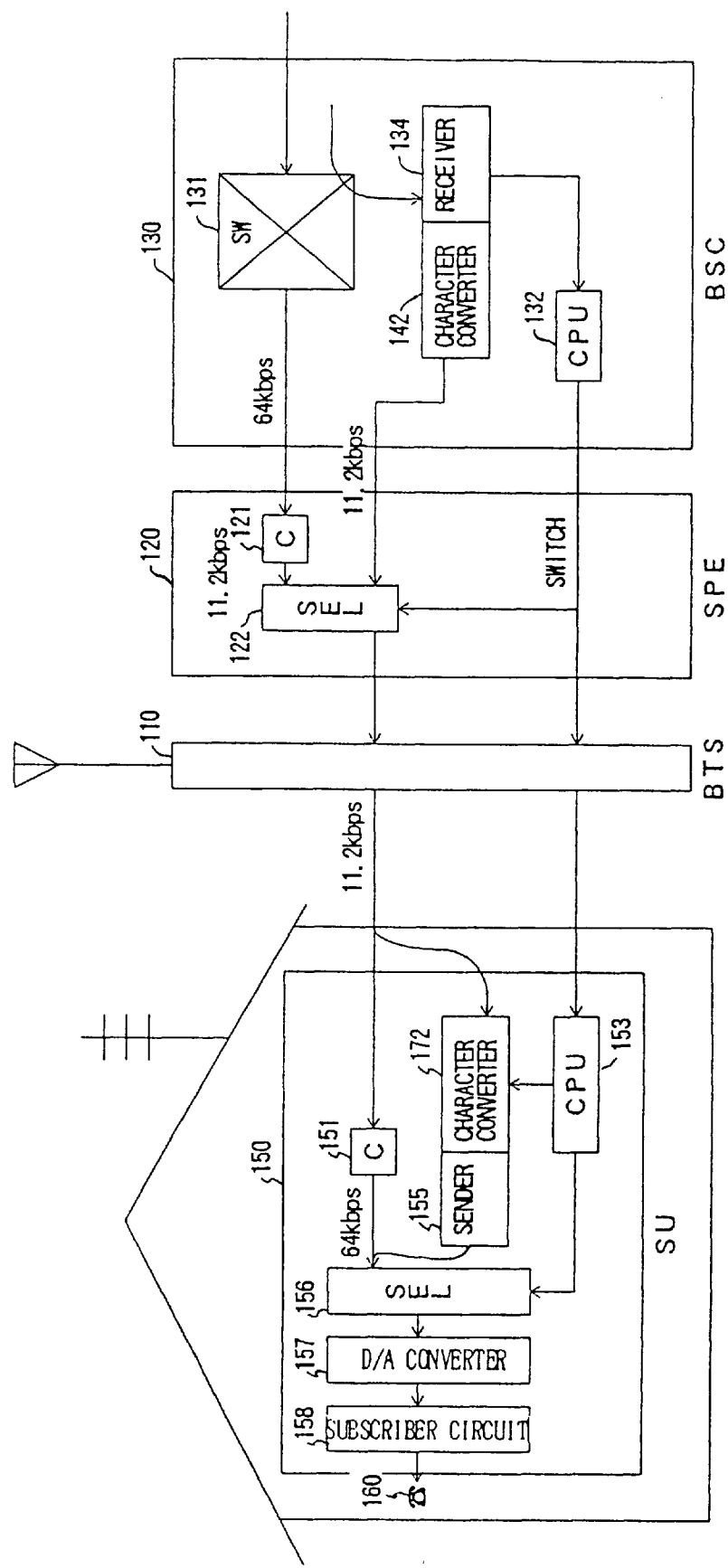
FIG. 26 shows a block diagram of an eleventh embodiment of the radio access system for the telematique service according to the present invention.

Next, a description will be given of an eleventh embodiment of the radio access system for the telematique service according to the present invention, by referring to FIG. 26. FIG. 26 shows a block diagram of the eleventh embodiment of the radio access system for the telematique service according to the present invention.

In the following, a description will be given of sequences in a case where the DTMF signal is transmitted on the down-link radio line from the PSTN side to the SU side.

In FIG. 26, speech data provided from the LE in the PSTN to the SW 131 in the BSC 130 is transmitted to the SPE 120 from the SW 131 on, for example, a 64-kbps fast traffic channel. Also, the speech data is provided from the SW 131 to the receiver 134 to detect the DTMF signal. When the DTMF signal is detected, the receiver 134 (constituting a fourth detection part) informs the CPU 132 and the character converter 142 of the detection of the DTMF signal. The character converter 142 converts the information into character data of the DTMF signal, and transmits the character data to the SPE 120 on, for example, an 11.2-kbps low-rate traffic channel. In response to the information of the DTMF signal detection, the CPU 132 generates a control command, and transmits the control command on a control channel to the SPE 120.

In the SPE 120, the fast traffic channel is speech-coded by the CODEC 121, for example, is converted to an 11.2-kbps low-rate traffic channel, and is provided to the SEL 122. On the other hand, the low-rate traffic channel transmitting the character data is provided to the SEL 122 without passing through the CODEC 121. In general, the SEL 122 selects the traffic channel from the CODEC 121 according to the control command on the control channel. When the DTMF signal is transmitted, the SEL 122 selects the traffic channel transmitting the character data of the DTMF signal produced from the character converter 142. The selected traffic channel with the control channel is transmitted to the SU 150 through the BTS 110.

In the SU 150, the traffic channel is provided to the CODEC 151 and a character converter 172. The CODEC 151 decodes the speech data to, for example, 64-kbps speech data, and provides it to a selector (SEL) 156. When the character converter 172 detects the character data of the DTMF signal, the character converter 172 informs a sender 155 of the detection of the DTMF signal. The sender 155 generates speech data of the DTMF signal corresponding to the character, and provides the speech data to a selector (SEL) 156.

When a CPU 153 receives a control command of the control channel transmitted from the BTS 110, the CPU 153 allows the character converter 172 to operate, and controls the SEL 156 to switch. Thus, in a normal state, the SEL 156 selects the speech data from the CODEC 151, and when the DTMF signal is transmitted, the SEL 156 selects the speech data of the DTMF signal. The selected speech data is provided to a digital-to-analog converter (D/A converter) 157. In the D/A converter 157, the speech data is converted to an analog speech signal, and is produced from the TEL 160 through a subscriber circuit 158.

Further, the present invention is not limited to these embodiments, but other variations and modifications may be made without departing from the scope of the present invention.

What is claimed is:

1. A radio access system connecting a public switched telephone network and a subscriber unit, wherein:
    said subscriber unit comprises:
        a first detection part to detect a telematique signal received from a common interface provided for the telematique signal and a voice signal, and
        a first control part to transmit a detection signal of said telematique signal on a control channel and to transmit said telematique signal on a traffic channel while bypassing a first speech coding-and-decoding part provided for the voice signal transferred via the common interface; and
    said radio access system comprises a second control part, provided between a radio base station and said public switched telephone network, to transmit said telematique signal on said traffic channel toward said public switched telephone network while bypassing a second speech coding-and-decoding part when said detection signal of said telematique signal is transmitted on said control channel.

2. The radio access system as claimed in claim 1, wherein each of said subscriber unit and said radio base station comprises a protocol conversion part to convert between a communication protocol for the telematique signal and a communication protocol for a telephone signal.

3. The radio access system as claimed in claim 1, wherein said subscriber unit comprises a subscriber termination device.

4. The radio access system as claimed in claim 1, wherein said subscriber unit comprises a mobile communication subscriber unit.

5. A radio access system connecting a public switched telephone network and a subscriber unit, said radio access system comprising:
    a first detection part to detect a telematique signal received from a common interface provided for the telematique signal and a voice signal; and
    a first control part to transmit a detection signal of said telematique signal on a control channel, and to transmit said telematique signal on a traffic channel while bypassing a second speech coding-and-decoding part provided for the voice signal transferred via the common interface, said first detection part and said first control part being provided between said public switched telephone network and a radio base station; and
    said subscriber unit comprising a second control part to transmit said telematique signal on said traffic channel while bypassing a first speech coding-and-decoding part when said detection signal of said telematique signal is transmitted on said control channel.

6. The radio access system as claimed in claim 5, wherein said first detection part comprises a plurality of detection parts, a number thereof being less than a number of lines between said public switched telephone network and said radio base station.

7. The radio access system as claimed in claim 5, wherein each of said subscriber unit and said radio base station comprises a protocol conversion part to convert between a communication protocol for the telematique signal and a communication protocol for a telephone signal.

8. The radio access system as claimed in claim 5, wherein said subscriber unit comprises a subscriber termination device.

9. The radio access system as claimed in claim 5, wherein said subscriber unit comprises a mobile communication subscriber unit.

10. The radio access system connecting a public switched telephone network and a subscriber unit, wherein:
    said subscriber unit comprises:
        a first detection part to detect a dual-tone multi-frequency (DTMF) signal received from a common interface provided for the telematique signal and a voice signal, and
        a first control part to transmit a detection signal of said DTMF signal on a control channel and to transmit said DTMF signal on a traffic channel while bypassing a first speech coding-and-decoding part provided for the voice signal transferred via the common interface; and
    said radio access system comprising a second control part, provided between a radio base station and said public switched telephone network, to transmit said DTMF signal on said traffic channel toward said public switched telephone network while bypassing a second speech coding-and-decoding part when said detection signal of said DTMF signal is transmitted on said control channel.

11. The radio access system as claimed in claim 10, wherein said subscriber unit comprises a subscriber termination device.

12. The radio access system as claimed in claim 10, wherein said subscriber unit comprises a mobile communication subscriber unit.

13. A radio access system connecting a public switched telephone network and a subscriber unit, said radio access system comprising:

a first detection part to detect a dual-tone multi-frequency (DTMF) signal received from a common interface provided for the telematique signal and a voice signal;

a first control part to transmit a detection signal of said DTMF signal on a control channel and to transmit said DTMF signal on a traffic channel while bypassing a second speech coding-and-decoding part provided for the voice signal transferred via the common interface, said first detection part and said first control part being provided between a radio base station and said public switched telephone network; and said subscriber unit comprising a second control part to control said DTMF signal transmitted on the traffic channel to bypass a first coding-and-decoding part when said detection signal of the DTMF signal is transmitted on said control channel.

14. The radio access system as claimed in claim 13, wherein said first detection part comprises a plurality of detection parts, a number thereof being less than a number of lines between said public switched telephone network and said radio base station.

15. The radio access system as claimed in claim 13, wherein said subscriber unit comprises a subscriber termination device.

16. The radio access system as claimed in claim 13, wherein said subscriber unit comprises a mobile communication subscriber unit.

* * * * *